US010821958B2

(12) United States Patent
Schreiber et al.

(10) Patent No.: US 10,821,958 B2
(45) Date of Patent: Nov. 3, 2020

(54) COMPUTATION UNIT AND OPERATING METHOD THEREFOR

(71) Applicant: Robert Bosch GmbH, Stuttgart (DE)

(72) Inventors: Matthias Schreiber, Vaihgen/Enz (DE);
Axel Aue, Korntal-Muenchingen (DE);
Nico Bannow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 16/003,724

(22) Filed: Jun. 8, 2018

(65) Prior Publication Data

US 2018/0354487 A1    Dec. 13, 2018

(30) Foreign Application Priority Data

Jun. 12, 2017    (DE) .................. 10 2017 209 856

(51) Int. Cl.
*B60W 10/06*    (2006.01)
*B60W 50/00*    (2006.01)

(52) U.S. Cl.
CPC ..... *B60W 10/06* (2013.01); *B60W 2050/0013* (2013.01); *B60W 2050/0088* (2013.01); *B60W 2510/06* (2013.01)

(58) Field of Classification Search
CPC combination set(s) only.
See application file for complete search history.

(56) References Cited

U.S. PATENT DOCUMENTS

| 6,643,796 B1 * | 11/2003 | Floyd ................. G06F 11/0793 |
| | | 712/227 |
| 2002/0039368 A1 * | 4/2002 | Musoll .................. G06F 9/546 |
| | | 370/412 |

* cited by examiner

*Primary Examiner* — Henry Tsai
*Assistant Examiner* — Juanito Borromeo
(74) *Attorney, Agent, or Firm* — Norton Rose Fulbright US LLP; Gerard Messina

(57) ABSTRACT

A computation unit having at least one computation core, a primary memory device, and at least one main connecting unit for connecting the at least one computation core to the primary memory device, the computation unit having at least two functional units, at least a first functional unit of the at least two functional units being embodied a) to receive first data from at least one further functional unit of the at least two functional units, and/or b) to transmit second data to at least one further functional unit of the at least two functional units.

14 Claims, 5 Drawing Sheets

COMPUTATION UNIT AND OPERATING METHOD THEREFOR

CROSS REFERENCE

The present application claims the benefit under 35 U.S.C. § 119 of German Patent Application No. DE 102017209856.2 filed on Jun. 12, 2017, which is expressly incorporated herein by reference in its entirety.

BACKGROUND INFORMATION

The present invention relates to a computation unit having at least one computation core, a primary memory device, and at least one main connecting unit for connecting the at least one computation core to the primary memory device. The present invention further relates to an operating method for such a computation unit. Computation units are generally commercially available, for example, in the form of microcontrollers.

SUMMARY

An object of the present invention is to improve a computation unit in such a way that it exhibits enhanced flexibility, enhanced operating reliability, and enhanced utilization benefits.

This object may be achieved according to the present invention. In accordance with the present invention, the computation unit has at least two functional units, at least a first functional unit of the at least two functional units being embodied a) to receive first data from at least one further functional unit of the at least two functional units, and/or b) to transmit second data to at least one further functional unit of the at least two functional units, at least one primary connecting unit being provided which is embodied to at least temporarily establish an, in particular direct, data connection between the first functional unit and at least one further functional unit of the at least two functional units, at least one component of the computation unit being embodied to modify a configuration of at least one functional unit and/or of the primary connecting unit, and the computation unit being embodied to at least temporarily suppress a modification of the configuration of the at least one functional unit and/or of the primary connecting unit.

The functional units according to the present invention may offer the possibility of expanding a computing performance and/or the functionality of the computation unit. In particular, the possibility according to the present invention of direct data exchange between the functional units makes possible a data flow that does not involve the further components of the computation unit, for example their computation cores or the primary memory device. Stresses on the computation cores or the primary memory device or the main connecting unit can thereby be reduced, while at the same time one or more functional units according to the present invention take on the calculation tasks provided for them.

Furthermore, in accordance with the present invention, at least one primary connecting unit is provided which is embodied to at least temporarily establish an, in particular, direct data connection between the first functional unit and at least one further functional unit of the at least two functional units. This advantageously enables control of a data exchange or data flow between various functional units so that, for example, configuration or reconfiguration of the data connection(s) between the relevant functional units is possible even while the computation unit is operating, enhanced flexibility thereby being achieved. In a preferred embodiment the primary connecting unit has at least one switching network. Particularly preferably, the switching network is configured as a non-blocking switching network. In this case the switching network makes possible the establishment, at any time, of data connections between all functional units connected to the switching network and, if applicable, to further units connected to the switching network, for example components of the computation unit. In further embodiments the primary connecting unit can also encompass other structures, for example at least one bus system that establishes a data connection between the functional units connected to the bus system. In further embodiments the primary connecting unit can also have at least one direct data connection between at least two functional units. Furthermore, in other embodiments direct data connections between more than two functional units are also possible.

It is furthermore provided according to the present invention that at least one component of the computation unit be embodied to modify a configuration of at least one functional unit and/or of the primary connecting unit; and that the computation unit be embodied to at least temporarily suppress a modification of the configuration of the at least one functional unit and/or of the primary connecting unit.

This on the one hand advantageously offers the possibility of adapting the functionality of the at least one functional unit by way of the modification of its configuration, so that the flexibility of the computation unit according to the present invention is further enhanced. On the other hand, this advantageously makes it possible, for example, to prevent an undesired modification of the configuration, so that reliability and dependability in the context of operation of the computation unit according to the present invention are again further enhanced.

In a further advantageous embodiment of the present invention, provision is made that several groups of functional units are provided, each of the several groups having allocated to it at least one primary connecting unit that is embodied to at least temporarily establish an, in particular direct, data connection between functional units of the relevant group. It is thereby possible to furnish, as it were, several clusters of functional units that can each perform calculations of the same or different kinds, or other tasks.

In a further embodiment of the present invention, provision is made that a primary connecting unit that is allocated to a group of functional units is embodied to establish a data connection between functional units of different groups. In further embodiments the primary connecting units that are allocated to the respective groups can in turn have at least one of the following components: a switching network, a bus system, at least one direct data connection.

In a further embodiment of the present invention, at least one secondary connecting unit is provided which is embodied to at least temporarily establish a direct data connection between the several groups. In a preferred embodiment the secondary connecting unit has at least one switching network. Particularly preferably, the switching network is configured as a non-blocking switching network. In this case the switching network enables the establishment, at any time, of data connections between all the functional units or groups of functional units connected to the switching network, and if applicable further units connected to the switching network, for example components of the computation unit. In further embodiments the secondary connecting unit can also encompass other structures, for example at least one bus system that establishes a data connection between the functional units or groups of functional units connected to the bus system. In further embodiments the secondary connecting unit can also have at least one direct data connection between at least two functional units or groups of functional units. Furthermore, in other embodiments direct data connections between more than two functional units or groups of functional units are also possible.

In a further embodiment of the present invention, provision is made that the primary connecting unit and/or the secondary connecting unit has a configuration memory for at least temporary storage of connection configuration data controlling operation of the relevant connecting unit, at least one computation core and/or at least one functional unit and/or at least one peripheral component of the computation unit in particular being embodied to modify at least a portion of the connection configuration data. It is thereby possible, for example, for a computation core of the computation unit to control the data flow between various functional units which runs via the primary and/or secondary connecting unit.

In a further embodiment of the present invention, provision is made that at least one functional unit has a local configuration memory that is embodied for at least temporary storage of configuration data characterizing a configuration of the at least one functional unit, at least one computation core and/or at least one other functional unit and/or at least one peripheral component of the computation unit being embodied to modify at least a portion of the configuration data. It is thereby possible, for example, for a computation core of the computation unit, or another functional unit, to influence the configuration of the relevant functional unit.

A further aspect results from a computation unit according to one of the embodiments above, at least one functional unit having a local configuration memory that is embodied for at least temporary storage of a configuration of the configuration data characterizing the at least one functional unit, at least one computation core and/or at least one other functional unit and/or at least one peripheral component of the computation unit being embodied to modify at least a portion of the configuration data.

In a further embodiment of the present invention, provision is made that at least one functional unit has a local function memory that is embodied for at least temporary storage of input data and/or output data of the functional unit or of intermediate results of calculations of the functional unit, at least one computation core and/or at least one other functional unit and/or at least one peripheral component of the computation unit being embodied to modify at least a portion of the data of the local function memory. It is thereby possible, for example, for a computation core or a peripheral component of the computation unit, or the other functional unit, to influence, for instance, output data of the relevant functional unit.

In a further embodiment of the present invention, provision is made that the computation unit is embodied to at least temporarily suppress at least one of the following actions: modification of the configuration memory of the primary connecting unit; modification of the configuration memory of the secondary connecting unit; modification of configuration data of at least one functional unit; modification of functional data of at least one functional unit. This advantageously offers the possibility of at least temporarily limiting in controlled fashion the flexibility furnished in accordance with the embodiments above, with the result that, for example, propagation of errors in the computation unit can be prevented and operating reliability therefore enhanced.

With this feature, possible safety requirements can be complied with by the fact that upon the occurrence of permanent and/or transient errors, those errors have no effect on safe operation, in particular the propagation of errors being limited and safe operation being thereby enabled.

In another embodiment of the present invention, provision is made that at least two functional units are connectable to one another by way of a direct data connection, the computation unit being embodied to at least temporarily inhibit the direct data connection or to suppress at least one modification of data of at least one of the at least two functional units via the direct data connection. As a result of the connection by way of the direct data connection, which in particular does not contain the primary or secondary connection unit, the possibility exists of, for example, operating two functional units coordinatedly with one another, so that together they can, for example, process data having a greater data width than would be possible for each of the two individual functional units. In addition, the direct data connection usable for this is advantageously at least temporarily inhibitable in order to prevent mutual influence between the participating functional units in the event of an error.

In a further embodiment of the present invention, provision is made that at least one of the functional units is embodied as a hardware circuit, in particular entirely as a hardware circuit. This results in a particular efficient, capable, and physically small assemblage.

In a further advantageous embodiment of the present invention, provision is made that the computation unit (in particular one of its functional units) is embodied to perform a detection of errors in the processing and/or storage and/or transfer of data by at least one of its components (e.g., computation core, primary memory device, functional unit, etc.). If an error has been detected, for example an error reaction can be initiated. The error reaction can encompass, for example, at least one of the following actions: transmitting an interrupt request (IRQ); blocking data or data packets transmittable by way of the primary connecting unit and/or by way of the secondary connecting unit; suppressing modification of connection configuration data of a primary and/or second connecting device; suppressing a modification of configuration data of at least one functional unit; suppressing modification of functional data of at least one functional unit. Particularly advantageously, in further embodiments the data to be processed and/or stored and/or transferred by at least one functional unit and/or by at least one other component are prepared or made available in such a way that error detection by the error-detecting functional unit is made possible, for example by adding redundant information to the data, in particular by way of parity information, error-correcting codes, etc.

For example, in some embodiments of the present invention, at least one functional unit can be provided which is embodied to equip additionally data with parity information and/or error correction codes. In a preferred embodiment the functional unit can be embodied to increase the Hamming distance of relevant data.

Particularly preferably, the computation unit according to the present invention can be used in a control device for a target system, for example in a control device for an internal combustion engine of a motor vehicle or for a radar-based range measuring system or the like. In contrast to conventional computation units, for example conventional microcontrollers, the computation unit according to the present invention is advantageously supplemented with the functionality (described in more detail below) furnished by the functional units, and can thus also be regarded as a microcontroller having the additional functionality enabled according to the present invention. In general, the computation unit according to the present invention can be used wherever conventional computation units, such as microcontrollers or microprocessors or digital signal processors or the like, are used, and where an additional functionality and/or higher performance as furnished by the functional units according to the present invention, as well as reliable operation, are desirable. It is furthermore possible to replace conventional computation units, present in existing systems, with the computation unit according to the present invention in order to enable more efficient processing of calculation tasks and other tasks hitherto executed by the conventional computation units. In accordance with some embodiments of the present invention, utilization of the computation unit according to the present invention is also particularly advantageously possible in the sector of processing safety-relevant data or for the processing of cryptographic algorithms.

In a further advantageous embodiment of the present invention, provision is made that at least one of the functional units has an input interface for receiving the first data and/or an output interface for outputting the second data. In preferred embodiments of the present invention, this/these input or output interface(s) can be used in particular for data exchange (transmission and/or reception) with other functional units of the same or of different kinds (or, if applicable, also with other components that have compatible interfaces corresponding to the input or output interface(s) of the functional units).

In a preferred embodiment of the present invention, input data for at least one functional unit can also be present in a primary memory device and/or in a secondary memory device and/or in further peripheral components. The primary memory device and/or second secondary memory device and/or peripheral components can each be subdivided into subunits in which the input data are present. For example, input data can be present in the primary and/or secondary memory device, the primary and/or secondary memory device being capable, for example, of having (if applicable, in addition to other memory types) a working memory, for example of the SRAM type. In a further advantageous embodiment, provision is made that at least one of the functional units is embodied to read data from, and/or to write data into, the primary memory device and/or the secondary memory device and/or further peripheral components (e.g. the addressable registers and/or memory regions of a DMA control unit and/or an interrupt request distributor device and/or further hardware accelerators). In a preferred embodiment, this can be accomplished in particular via an interface that is (of a) different (type) from the input or output interface(s) recited above, for example also indirectly via the interface that is (of a) different (type) from the input or output interface(s) recited above, and e.g., via at least one primary and/or secondary connecting unit.

In accordance with a further embodiment of the present invention, the input interface and/or the output interface can be respectively embodied, for example, to receive specific first data for the functional unit in a predefinable format, for example in the form of data packets, and to output specific second data to another unit, for example another functional unit, in a predefinable format, for example once again in the form of data packets.

The input interface can be embodied, for example, to be linked to the primary connecting unit. Depending on the embodiment of the primary connecting unit, the input interface can therefore be embodied, for example, to be linked to a switching network and/or to a bus system. Alternatively or in supplementary fashion, the input interface can also be embodied to establish a direct data connection between the relevant functional unit and at least one further functional unit, for example by way of directly wired data leads. The same statements apply correspondingly to the configuration of the output interface in further embodiments of the present invention.

In a further embodiment of the present invention, provision is made that at least one of the functional units has a local control device for controlling operation of the functional unit. For example, a local controller of this kind can encompass at least one state machine. In a further advantageous embodiment, at least one of the functional units has a local calculation unit. In a further advantageous embodiment the local calculation unit can have at least one coarse-grain hardware element or can be embodied as a coarse-grain hardware element.

In a further advantageous embodiment of the present invention, the computation unit, in particular at least one functional unit, is embodied to perform a detection of errors in input data by evaluating parity information, and/or a correction of errors by way of error-correcting codes. The parity information and/or error-correcting codes can be created, for example, together with the output data of at least one further functional unit and/or also of further components of the computation unit, for instance a computer core and/or the memory device and/or a bus system or a connecting unit, and/or further peripheral components. In an advantageous embodiment, upon detection of errors functional units can react with an error reaction, for example by outputting a special error signal.

In other words, the embodiments are very well suited for carrying out in a simple manner, for instance, a redundant calculation (for example, when several similar or identical functional units that can be used redundantly are present), and/or e.g., to detect, by evaluation of parity information, errors in input data that have occurred in the context of transmission of the data (for example, when corresponding parity information is available), and/or to allow errors in input data which have occurred upon transmission of the data to be corrected by way of error-correcting codes (for example, when error-correcting codes are used).

In a further advantageous embodiment of the present invention, at least one functional unit is provided which is embodied to evaluate mutually redundant calculations of computation cores and/or of peripheral units of the computation unit. For example, mutually redundant calculations can be executed by the components recited below, and the at least one functional unit, which for example can be a comparing functional unit as described above, is embodied to compare the results of the redundant calculations with one another, for example in order to detect an error: (computation core, functional unit), (computation core, computation core), (computation core, peripheral component of the computation unit), (peripheral component of the computation unit, functional unit). In an embodiment of the present invention, for example, mutually redundant calculations can therefore be performed by a computation core of the computation unit and by a peripheral component of the computation unit, and in accordance with the present embodiment the at least one functional unit is embodied to evaluate the relevant results of the redundant calculations, in particular to compare them with one another.

Further advantageous embodiments are described herein.

Further ways of achieving the object of the present invention are provided by a control device in accordance with the present invention and a method in accordance with the present invention.

Further features, potential applications, and advantages of the present invention are evident from the description below of exemplifying embodiments of the present invention which are depicted in the Figures. All features described or depicted in that context, individually or in any combination, constitute the subject matter of the present invention, regardless of their respective presentation and depiction in the description and the figures, respectively.

DETAILED DESCRIPTION OF EXAMPLE EMBODIMENTS

Figure 1A:
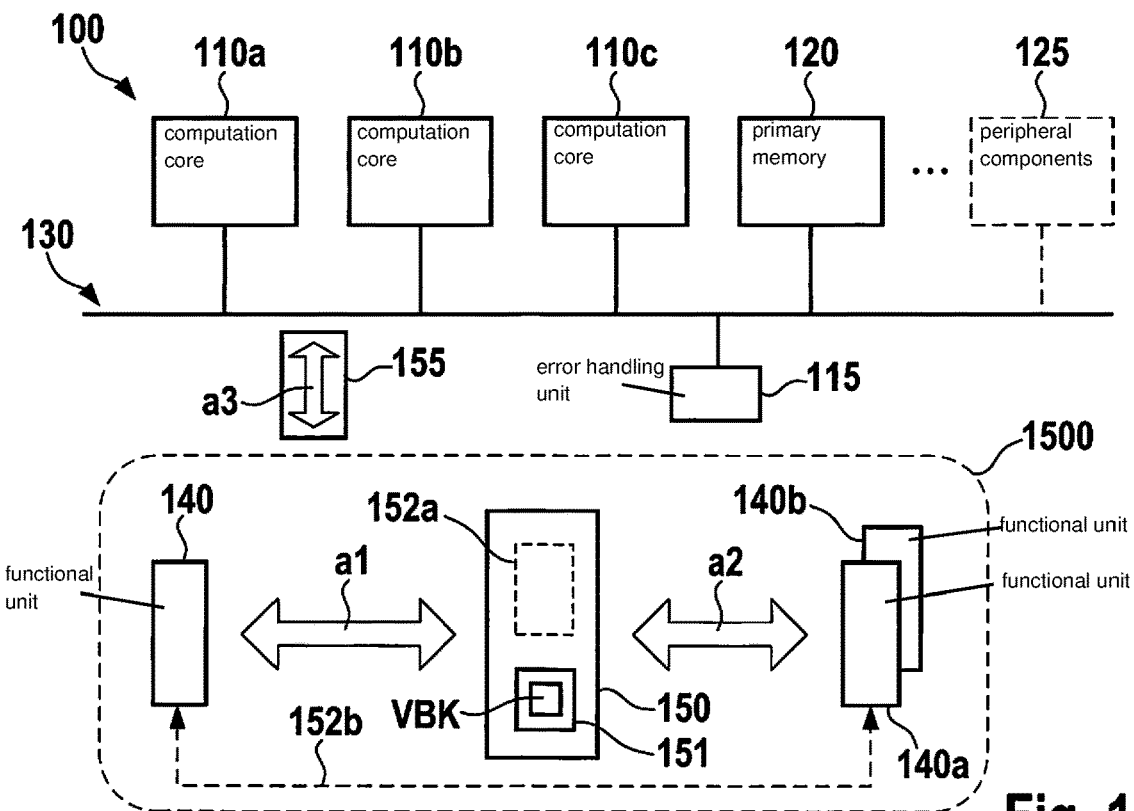
FIG. 1A is a schematic block diagram of an embodiment of the computation unit according to the present invention.

FIG. 1 is a schematic block diagram of an embodiment of computation unit 100 according to the present invention. Computation unit 100 has several computation cores 110a, 110b, 110c, as well as a primary memory device 120. A main connecting unit 130 (e.g., a core interconnect), for example a bus system or a switching network or crossbar switch, is provided for connecting the computation cores to one another and for connecting the computation cores to primary memory device 120. Computation unit 100 optionally has further peripheral components, which is indicated in the present case by block 125 depicted with dashed lines. Such peripheral components can be, for example, analog/digital converters, input/output interfaces, timing modules, direct memory access (DMA) control units, or the like. In an embodiment, primary memory device 120 can advantageously have both at least one working memory (direct access memory, random access memory, RAM), in particular of the SRAM type and/or DRAM type, and at least one nonvolatile memory (nonvolatile RAM, NVRAM), for example in the form of flash, EPROM, ferroelectric RAM (FeRAM), magnetoresistive RAM (MRAM), phase-change RAM (PCRAM).

According to the present invention, computation unit 100 has at least two functional units, at least one first functional unit 140a being embodied to receive first data from at least one further functional unit 140, 140b and/or to transmit or output second data to at least one further functional unit 140, 140b. Also according to the present invention, at least one primary connecting unit 150 is provided which is embodied to at least temporarily establish an, in particular direct, data connection a1, a2 between first functional unit 140a and at least one further functional unit 140, 140b of the at least two functional units.

Also according to the present invention, at least one component 110a, 125, 140 of computation unit 100 is embodied to modify a configuration of at least one functional unit 140, 140a, 140b and/or of primary connecting unit 150, with the result that a functionality of the relevant functional unit 140, 140a, 140b or of primary connecting unit 150 can be influenced. Computation unit 100 can thereby be adapted particularly flexibly to different areas of application. Such a modification of the configuration of the at least one functional unit 140, 140a, 140b and/or of primary connecting unit 150 can also be accomplished, in particular, dynamically, i.e., while computation unit 100 is operating.

Also according to the present invention, computation unit 100 is embodied to at least temporarily suppress a modification of the configuration of the at least one functional unit 140, 140a, 140b and/or of primary connecting unit 150. Propagation of errors within computation unit 100 can thereby advantageously be prevented.

Functional units 140, 140a, 140b according to the present invention advantageously offer the possibility of expanding a computation performance and/or the functionality of computation unit 100. In particular, the capability according to the present invention for direct data exchange between the functional units makes possible a data flow that does not involve the further components of computation unit 100, for example its computation cores 110a, 110b, 110c or primary memory device 120 or main connecting unit 130. Stresses on computation cores 110a, 110b, 110c, on primary memory device 120, and on main connecting unit 130 can thereby be relieved, while at the same time one or more functional units 140, 140a, 140b according to the present invention can perform the calculation tasks provided for them, or other tasks.

For example, functional units 140, 140a, 140b according to the present invention, which are implemented preferably predominantly, but particularly preferably entirely, as a hardware circuit, can be embodied to perform calculations and/or logic operations and/or other functions. The implementation of lookup tables, characteristic curves, and/or characteristics diagrams by way of functional units is likewise possible. Details regarding an internal structure of the functional units and their communication with one another are provided below, inter alia with reference to FIGS. 2A, 2B. What will be discussed firstly below, however, with reference to FIGS. 1A to 1F, is the disposition of the functional units within computation unit 100 according to the present invention and their data linkage to central components 110a, 110b, 110c, 120, 130 of computation unit 100.

As described above, at least one primary connecting unit 150 is provided which is embodied to at least temporarily establish an, in particular direct, data connection between first functional unit 140a and at least one further functional unit 140, 140b. This advantageously enables control of a data exchange or data flow between various functional units, so that configuration or reconfiguration of the data connection(s) between the relevant functional units is possible even while the computation unit is operating, with the result that enhanced flexibility is achieved. A "direct data connection" is understood in the present case to mean that data can be exchanged between the participating functional units without using main connecting unit 130 of computation unit 100. Instead, primary connecting unit 150 makes possible, for example, a direct data connection of this kind between the functional units linked to it, cf. arrows a1, a2 which indicate a data flow between components 140, 140a, 140b and primary connecting unit 150.

In a preferred embodiment, primary connecting unit 150 has at least one switching network 152a. The switching network is designed particularly preferably as a non-blocking switching network. In this case switching network 152a makes possible the establishment, at any time, of data connections between all functional units 140, 140a, 140b connected to switching network 152a and, if applicable, further units connected to the switching network, for example components 130 of the computation unit. In further embodiments it is also possible to design primary connecting unit 150 as a switching network that is not non-blocking.

In further embodiments, primary connecting unit 150 can also encompass other structures, for example at least one bus system or at least one direct data connection between at least two functional units. In other embodiments, direct data connections 152b (e.g., in the form of hard-wired data leads) between other, or more than two, functional units are also possible alternatively or as a supplement to switching network 152a or in general to primary connecting unit 150. In a further embodiment, provision can be made that the at least one primary connecting unit 150 has several of the connecting mechanisms recited above, i.e., for example a switching network for connecting some functional units or all functional units to one another and, for example, a bus system that connects several or all functional units.

In a further embodiment, at least one secondary connecting unit 155 (cf. FIG. 1A) is provided which is embodied to establish a data connection (cf. arrow a3), either directly and/or indirectly via primary connecting unit 150, between main connecting unit 130 and at least one functional unit 140, so that a high-performance link therefore exists for data transfer between the relevant functional units 140, 140a, 140b and 110a, 110b, 110c, 120, 125 via main connecting unit 130.

All in all, the provision of functional units 140, 140a, 140b, and their flexible connection to one another which is established by way of primary connecting unit 150, make it possible to furnish additional computing performance or additional functionalities within computation unit 100 according to the present invention. The totality of components 140, 140a, 140b, 150 can thus advantageously also be construed as a "flexible hardware supplement" 1500 to computation unit 100, this flexible hardware supplement 1500 particularly advantageously being capable of executing computation tasks substantially autonomously, i.e., independently of components 110a, 110b, 110c, 120, 125, 130, but being capable, as necessary, of efficiently exchanging data with at least one of components 110a, 110b, 110c, 120, 125, 130 via the linkage of secondary connecting unit 155.

In an embodiment, primary connecting unit 150 has a configuration memory 151 for at least temporary storage of connection configuration data VBK controlling the operation of primary connecting unit 150. In an embodiment, connection configuration data VBK can control, for example, whether data packets transmitted from a first functional unit to a second functional unit are forwarded from primary connecting unit 150 to the second functional unit at all, or not at all, or whether they are, if applicable, forwarded in delayed fashion. In a further embodiment at least one component of computation unit 100, for example a computation core 110a and/or at least one functional unit 140 and/or at least one peripheral component 125 of computation unit 100, can be embodied to modify at least a portion of connection configuration data VBK. The relevant component of computation unit 100 can thereby influence control of the data flow through primary connecting unit 150. Particularly advantageously, for example, a computation core 110a can at least transiently modify connection configuration data VBK in such a way that a data transfer from one functional unit to a second functional unit is essentially suppressed for that period of time. The interruption correspondingly does not necessarily need to be coupled to further conditions, for example the fact that an error has previously occurred. This advantageously ensures that errors occurring within functional units cannot propagate to the at least transiently disconnected functional units, in particular not by way of primary connecting unit 150. In advantageous embodiments the disconnection can be used for the calculation of safety-relevant functions in order to comply with specific safety requirements. In further advantageous embodiments, the disconnection of data transfer between functional units can be canceled again, for example in order to transiently calculate non-safety-relevant functions. Particularly advantageously, for example, a carryover of errors from a first functional unit to a second functional unit or to further functional units can also be prevented only in the event of occurrence of an error. This situation can occur, for example, if a specific functional unit is furnishing erroneous output data and outputting them via primary connecting unit 150 to one or more other functional units. If a computation core 110a, for example, has detected this error state, it can, at least transiently, correspondingly modify connection configuration data VBK in order to prevent the erroneous output data from being outputted to the other functional units.

In a further embodiment an error situation can also, for example, be signaled to an error handling unit 115.

Figure 1B:
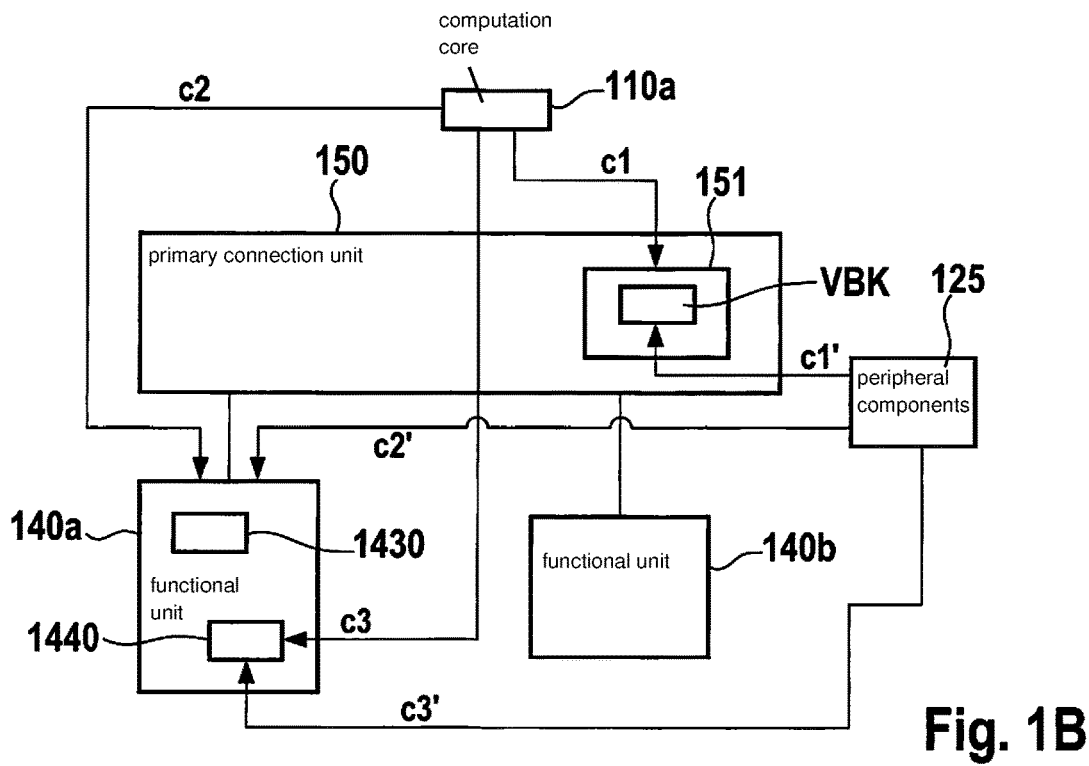
FIGS. 1B-1F schematically depict further embodiments of the computation unit according to the present invention.

FIG. 1B is a schematic block diagram of some components of the computation unit according to the present invention, in accordance with a further embodiment. It depicts a first computation core 110, primary connecting unit 150 and, by way of example, two functional units 140a, 140b. Also illustrated in FIG. 1B is an operational connection c1 proceeding from first computation core 110a to connection configuration data VBK of primary connecting unit 150. Operational connection c1 can be implemented, for example, by way of a main connecting unit 130 between computation core 110a and configuration memory 151 of primary connecting unit 150. Also illustrated in FIG. 1 is an operational connection c1' proceeding from a further peripheral component 125 to connection configuration data VBK of primary connecting unit 150. Operational connection c1' can be implemented, for example, by way of a directly wired connection between further peripheral component 125 and configuration memory 151 of primary connecting unit 150.

Functional unit 140a has a local configuration memory 1430 that is embodied for at least temporary storage of a configuration of the configuration data characterizing at least one functional unit. Functional unit 140a furthermore has a local function memory 1440 that is embodied for at least temporary storage of input data and/or output data of functional unit 140a and/or for storage of intermediate results of calculations of functional unit 140a. Further functional unit 140b can possess comparable local configuration memories and functional memories, although for reasons of clarity these are not illustrated in FIG. 1B.

In an embodiment, first computation core 110 and/or a peripheral component 125 are embodied to modify at least a portion of the configuration data in configuration memory 1430. This is indicated in FIG. 1B by arrows c2, c2'. In a further embodiment, first computation core 110a and/or peripheral component 125 are embodied to modify at least a portion of the data of local function memory 1440 of functional unit 140a. This is indicated in FIG. 1B by arrows c3, c3'.

In other embodiments, it is also possible for one or more other components, instead of first computation core 110a and/or peripheral component 125 or in addition thereto, of computation unit 100 (FIG. 1A) to be embodied to modify connection configuration data VBK and/or the configuration data of configuration memory 1430 and/or at least a portion of local function memory 1440. A great deal of flexibility in the context of operation of the computation unit and its functional units results therefrom. In particular, a reconfiguration of the relevant functional units can be accomplished dynamically.

In a further embodiment, provision is made particularly advantageously that computation unit 100 is embodied to at least temporarily suppress at least one of the following actions: modification of configuration memory 151 of primary connecting unit 150; modification of configuration data of at least one functional unit 140a; modification of functional data of at least one functional unit 140a.

In a further advantageous embodiment, computation unit 100 or at least one of its components, preferably at least one functional unit 140b, is embodied to perform a detection of errors in input data by evaluating parity information, and/or a correction of errors in input data by way of error-correcting codes. The parity information can be created, for example, in at least one component of computation unit 100 or at least one of its components, preferably at least one functional unit 140, 140a, 140b, and/or a computation core 110a, 110b, 110c and/or memory device 120 and/or a bus system 130 or a connecting unit 150, 155 for the output data which are sent to functional unit 140b. In further embodiments this principle can also be applied to utilization of the error-correcting codes.

In further advantageous embodiments, provision can be made that a modification of connection configuration data VBK or of data of configuration memory 1430 or of data of local function memory 1440 is accomplished depending on the detection of errors. In further advantageous embodiments provision can be made that a modification of connection configuration data VBK or of data of configuration memory 1430 or of data of local function memory 1440 is at least temporarily suppressed depending on the detection of errors, in order to prevent propagation of errors within the computation unit.

Figure 1C:
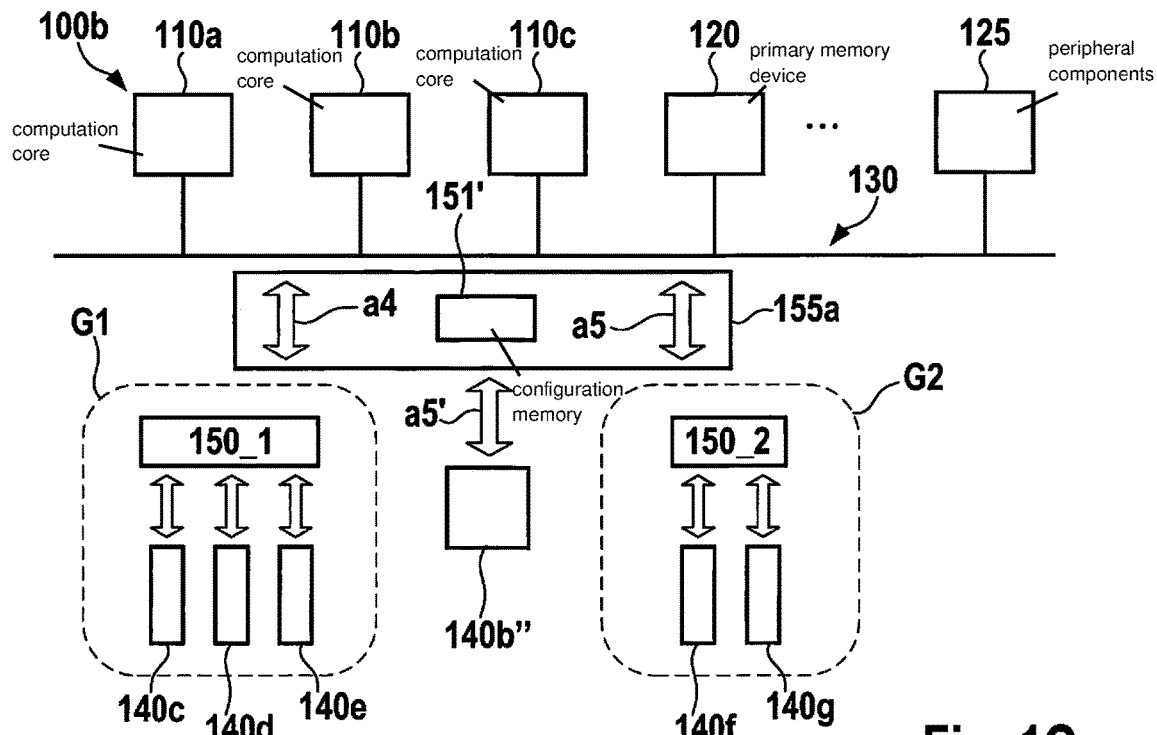

FIG. 1C shows a further embodiment 100b of the computation unit according to the present invention. Analogously to FIG. 1A, computation unit 100b in accordance with FIG. 1C once again has three computation cores 100a, 100b, 100c and a primary memory device 120, and if applicable further peripheral units, although the latter are not explicitly illustrated in FIG. 1C but instead are symbolized by the three dots to the right of primary memory device 120. In the present embodiment a flexible hardware supplement is provided in the form of several groups G1, G2 of functional units. In the present case a first group G1 has, by way of example, three functional units 140c, 140d, 140e that are connected to one another via a first primary connecting unit 150_1. In the present case a second group G2 has, by way of example, two functional units 140f, 140g that are connected to one another via a second primary connecting unit 150_2. First primary connecting unit 150_1 is embodied to at least temporarily establish an, in particular direct, data connection between functional units 140c, 140d, 140e of first group G1. Second primary connecting unit 150_2 is embodied to at least temporarily establish an, in particular direct, data connection between functional units 140f, 140g of second group G2. First primary connecting unit 150_1 and/or second primary connecting unit 150_2 can be embodied, for example, as a switching network, in particular a non-blocking switching network, a bus system, a direct data connection, at least one combination thereof, or in some other manner. A corresponding data connection of the respective functional units of the same group is symbolized by block arrows (not further characterized) between the relevant functional units and the respectively allocated primary connecting unit.

The present embodiment 100b of the computation unit makes it possible to furnish, as it were, several "clusters" G1, G2 of functional units that can each perform calculations of the same or of different kinds, or other tasks. In a particularly preferred embodiment, provision is made that the two clusters or groups G1, G2 perform mutually redundant calculations using the same input data. In addition, at least one further functional unit 140b" can be provided in computation unit 100b in order to evaluate the resulting output data in terms of detecting, according to the present invention, errors in the processing and/or storage and/or transfer of data, in particular in order to compare the data or to check the data transfer for errors based on parity information or to correct, by way of error-correcting codes, the data that are received. With this embodiment it is also possible in particular to detect errors that occur in at least one of primary connecting units 150_1, 150_2.

In the present case, a data connection between groups G1, G2 of further functional unit 140b" and main connecting unit 130 is implemented by way of a secondary connecting unit 155a that can be embodied, for example, as a switching network, a bus system, or in another form. Corresponding data connections are symbolized by block arrows a4, a5, a5'. Secondary connecting unit 155a can furthermore be embodied to establish a direct data connection between groups G1, G2 or their functional units, i.e. with no involvement of main connecting unit 130 in such a data connection.

In a further embodiment (not shown), provision is made that a primary connecting unit 150_1, which is allocated to a group G1 of functional units, is embodied to establish a data connection between functional units of different groups G1, G2 and/or further functional unit 140b".

Secondary connecting unit 155a has a configuration memory 151' that can be embodied comparably to configuration memory 151 of primary connecting unit 150 (FIG. 1A) and can accordingly be provided for at least temporary storage of connection configuration data (not shown) of secondary connecting unit 155a.

In some embodiments, the connection configuration data of secondary connecting unit 155a which are stored in configuration memory 151' can also be modified by at least one component 110a, 125, 140c of computation unit 100b, resulting in effects comparable to those of component 150 described above with reference to FIG. 1A. This offers, for example, the capability of ensuring and suppressing data exchange, indirectly respectively via main connecting unit 130, the functional units of group G1 having the further components 110a, 125 of computation unit 100, and the functional units of group G2 having the further components 110a, 125 of computation unit 100. In further embodiments, provision can be made that computation unit 100b (FIG. 1C) is embodied to at least temporarily suppress the modification of connection configuration data or of data of configuration memory 151' of secondary connecting unit 155a.

Figure 1D:
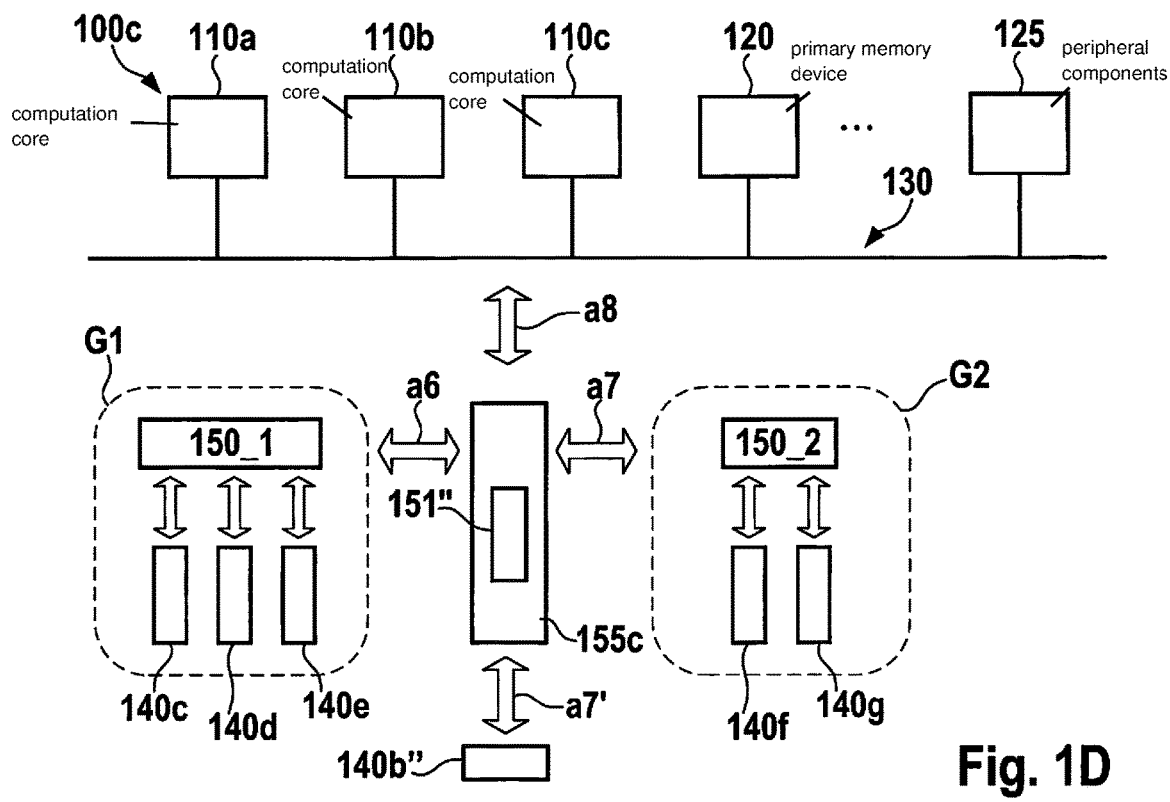

FIG. 1D shows a further embodiment 100c of the computation unit according to the present invention. In contrast to the embodiment in accordance with FIG. 1C, a secondary connecting unit 155*c* is provided which respectively establishes a data connection a6, a7 between primary connecting units 150_1, 150_2 of groups G1, G2 and a data connection a8 between those elements and main connecting unit 130. A functional unit 140*b''* provided for error detection is likewise linked to secondary connecting unit 155*c* (cf. arrow a7'). Secondary connecting unit 155*c* has a configuration memory 151'' that, in accordance with further embodiments, is modifiable at least temporarily by at least one component of computation unit 100*c*, in particular e.g. by a computation core 110*a* and/or a peripheral component 125 and/or a functional unit 140*c*, in order to influence a data flow of data between the functional units and via secondary connecting unit 155*c*. Secondary connecting unit 155*c* in particular makes it possible to effect and suppress a data exchange of the functional units of group G1 with the functional units of group G2.

In further embodiments provision is made that computation unit 100*c* at least temporarily suppresses modifications of configuration memory 151''.

In an embodiment, provision is made that the two groups G1, G2 perform mutually redundant calculations whose results can be evaluated by functional unit 140*b''* for the purpose of error detection. In further embodiments it is possible for functional units of first group G1 to perform redundant calculations sequentially in time, for example to repeat the same calculation task on the same input data several times successively; and for a further functional unit, for example a functional unit of second group G2 or functional unit 140*b''*, to perform an evaluation of the results thereby obtained for the purpose of error correction, in particular by the fact that the output data redundantly calculated in group G1 are respectively transferred to the evaluating functional unit of second group G2 or to functional unit 140*b''*.

Figure 1E:
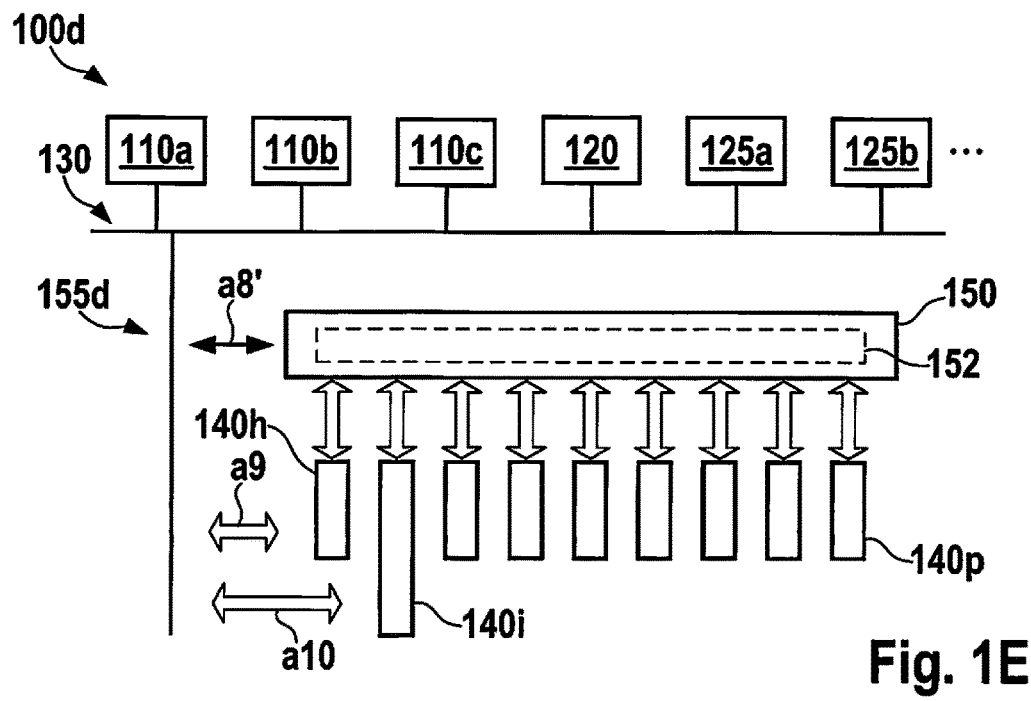

FIG. 1E shows a further embodiment 100*d* of the computation unit according to the present invention. It shows further peripheral components of computation unit 100*d*, for example analog/digital converters 125*a*, interface modules 125*b*. In this embodiment a bus system 155*d*, which establishes a data connection a8' between main connecting unit 130 and primary connecting unit 150, is furthermore provided as a secondary connecting unit. Primary connecting unit 150 preferably in turn has a switching network 152 in order to interconnect the various functional units 140*h*, 140*i*, . . . , 140*p*. Functional unit 140*h* optionally has, in addition to its data connection to switching network 152, a direct data connection a9 to bus system 155*d*. Further functional unit 140*i* is linked in comparable fashion to bus system 155*d* by way of both switching network 152 and a direct connection a10.

In an advantageous embodiment at least one of functional units 140*h*, 140*i*, . . . , 140*p* can be embodied to detect errors in the processing and/or storage and/or transfer of data by at least one component of computation unit 100*d*, in particular also for evaluation of mutually redundant calculations of components of the computation unit according to the present invention which do not encompass, or do not encompass only, functional units but additionally and/or exclusively encompass, particularly advantageously, computation cores 110*a*, 110*b*, 110*c* and/or peripheral units 125.

In some embodiments, it is possible for one or more functional units 140 to access primary memory device 120; this is usually accomplished using main connecting unit 130, secondary connecting unit 155, and if applicable a primary connecting unit 150 (FIG. 1A).

In some embodiments, at least one component 110*a*, 125*a*, 125*b*, 140*h* of computation unit 100*d* is embodied to modify a configuration of at least one functional unit 140*i*, . . . , 140*p* and/or of primary connecting unit 150, computation unit 100*d* being embodied to at least temporarily suppress such a modification of the configuration of the at least one functional unit and/or of the primary connecting unit.

Figure 1F:
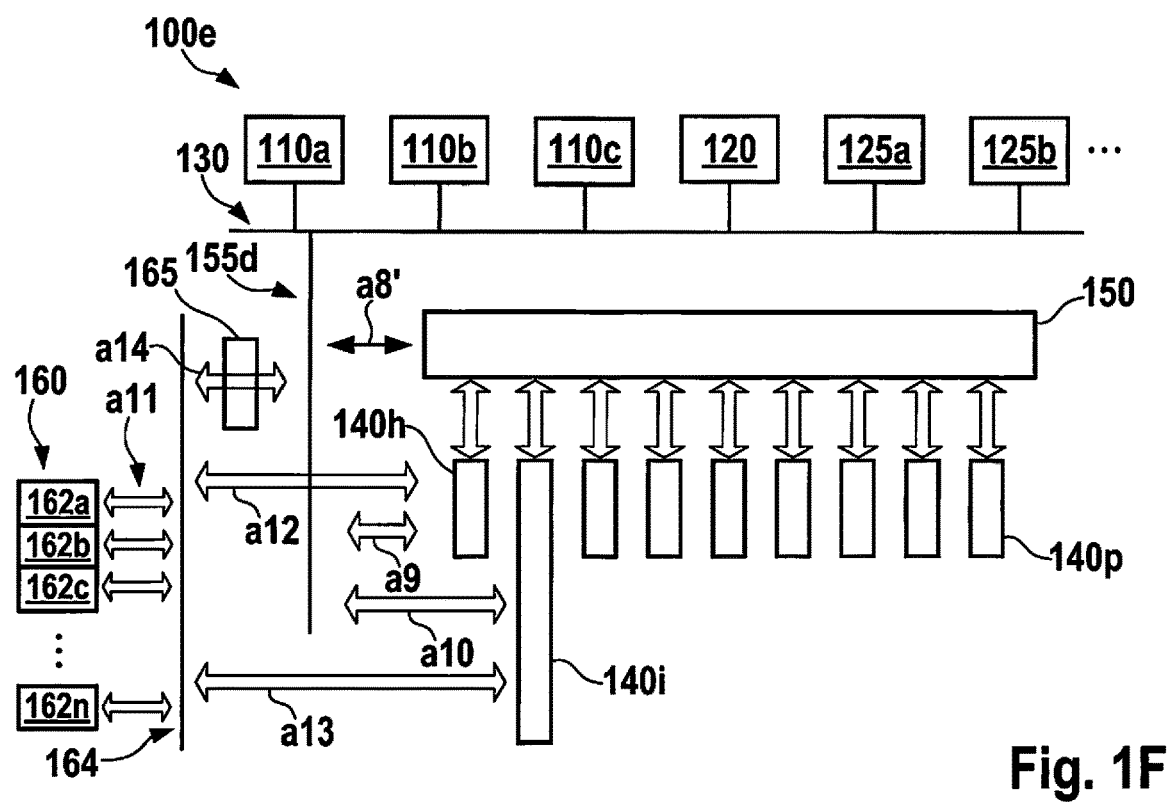

In a further preferred embodiment 100*e* of the computation unit according to the present invention which is described below with reference to FIG. 1F, at least one secondary memory device 160 is provided. Secondary memory device 160 is preferably embodied as a random access memory (RAM), in particular as a static random access memory (static RAM, SRAM). In the present case, one secondary memory device 160 is illustrated by way of example; in further embodiments, however, several secondary memory devices 160 can also be provided. The aspects described below, which are explained by way of example with reference to a secondary memory device 160 illustrated in FIG. 1F, apply correspondingly to such embodiments.

In a particularly advantageous embodiment, second memory device 160 has several memory banks 162*a*, 162*b*, 162*c*, . . . , 162*n*. In particular, the secondary memory device can be embodied to enable parallel data access to at least two of the several memory banks 162*a*, 162*b*, 162*c*, . . . , 162*n*. This advantageously makes possible a large bandwidth for accesses to secondary memory 160 or to its banks, and in particular, even non-contiguous data blocks can be written into secondary memory device 160, or read from secondary memory device 160, in parallel or simultaneous fashion.

In a further preferred embodiment, data of secondary memory device 160 can also, in order to enhance operating reliability, be supplemented with parity information for the detection of errors and/or stored in memory device 160 in a manner equipped with error-correcting codes (ECCs). When an error is detected it can be corrected if it is correctable. If applicable, an error reaction, for example an interrupt request (IRQ), can be initiated. This can make possible, if applicable, a distinction between correctable and non-correctable errors.

In a further embodiment, data can also be stored redundantly in memory device 160 in order to enhance operating reliability. For example, the data stored in a first memory bank 162*a* can be the same as those in a second memory bank 162*b*. Optionally, at least one functional unit can compare the contents of the relevant memory banks with one another in order to detect a possible occurrence of errors in the storage of data and, if applicable, to initiate an error reaction, for example an IRQ.

In an advantageous embodiment it is also possible for a functional unit 140*h* or several functional units (140, 140*a*, . . . , 140*g*) to collectively, preferably cyclically, create and evaluate checksums over at least some memory regions of primary memory device 120 and/or of secondary memory device 160, so that errors in the region of memory device 120 and/or 160, for example undesired changes of state, can be detected.

In the present case, secondary memory device 160 has allocated to it a memory bus system 164 that enables access to the memory banks of secondary memory device 160 (cf. block arrows a11). Memory bus system 164 is advantageously coupled via a bus coupling unit 165 to bus system 155*d*, which enables the data connection, already described above, between switching network 152 or functional units 140*i*, 140*k*, . . . , 140*p* and main connecting unit 130. Bus coupling unit 165 enables data exchange between bus system 155*d* and memory bus system 164 (cf. arrow a14). This in particular allows memory regions of secondary memory device 160 to become visible in a global address space of computation unit 100*e*, and thus also, for example, to be accessible (read and/or write) to other peripheral components 125*a*, 125*b* of computation unit 100 according to the present invention. In a particularly preferred embodiment a direct data connection a12, a13 can furthermore exist between individual functional units 140*h*, 140*i* and memory bus system 164, so that the relevant functional units 140*h*, 140*i* can access secondary memory device 160 directly, in particular without needing to use the switching network of primary connecting network 150 or, if applicable, main connecting unit 130. In a further embodiment (not shown) several parallel memory devices 160 having the features recited above can be present.

In some embodiments, at least one component 110*a*, 125*a*, 125*b*, 140*h* of computation unit 100*e* is embodied to modify a configuration of at least one functional unit 140*i*, . . . , 140*p* and/or of primary connecting unit 150, computation unit 100*e* being embodied to at least temporarily suppress such a modification of the configuration of the at least one functional unit and/or of the primary connecting unit.

Figure 2A:
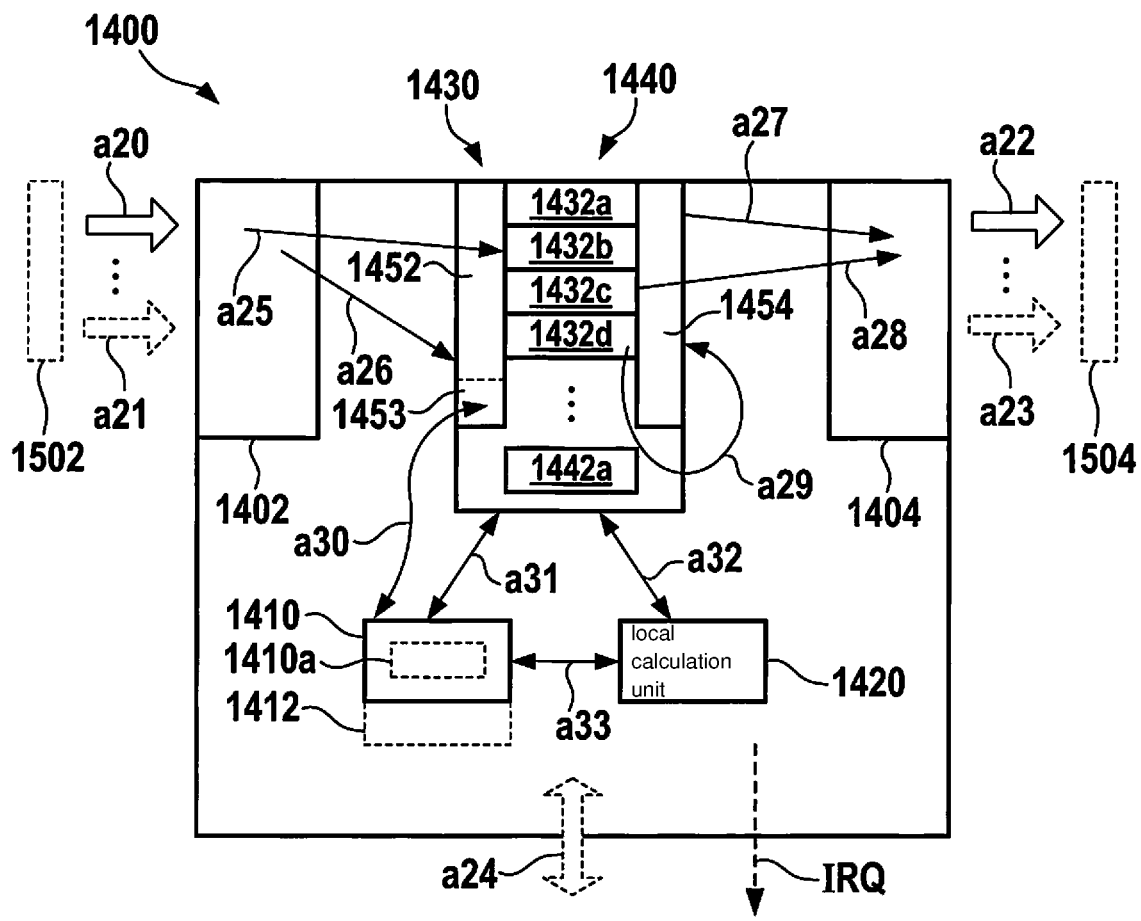
FIG. 2A is a schematic, simplified block diagram of a functional unit in accordance with an embodiment of the present invention.
Figure 2B:
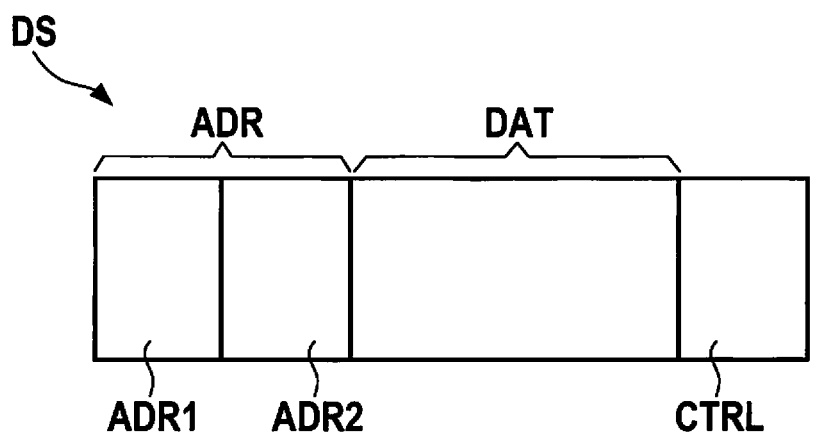
FIG. 2B schematically shows a data structure in accordance with an embodiment of the present invention.

Details relating to a construction of the functional units according to the present invention are described below in more detail with reference to FIGS. 2A, 2B. FIG. 2A schematically shows for this purpose a simplified block diagram of a functional unit 1400 in accordance with an embodiment of the invention. The structure of functional unit 1400 described below with reference to FIG. 2A can be present, for example, in a context of one or more of, or all, functional units 140, 140*a*, . . . , 140*p* recited above and described with reference to FIGS. 1A to 1F, in the manner illustrated in FIG. 2A or at least in a similar manner. It is understood that deviations from the structure described in FIG. 2A are likewise possible in accordance with further embodiments.

Functional unit 1400 has an optional, but typically present, input interface 1402 for receiving first data that are transferred, for example, from a further functional unit (not shown) to functional unit 1400 in accordance with FIG. 2A. For further description of FIG. 2A it is assumed, for example, that functional unit 1400 has, via its input interface 1402, at least one data connection to a primary connecting unit 150 (compare FIG. 1A), primary connecting unit 150 preferably having a switching network 152*a*. A corresponding output interface of switching network 152*a*, which is connected to input interface 1402 of functional unit 1400, is symbolized in FIG. 2A by rectangle 1502 drawn with dashed lines. First input data, which are deliverable to input interface 1402 of functional unit 1400 via output interface 1502 of switching network 152 (FIG. 1A), are identified in FIG. 2A by block arrow a20.

In a further advantageous embodiment, provision can be made that several input data are deliverable, in particular simultaneously, to functional unit 1400, this being indicated in FIG. 2A by block arrow a21 drawn with dashed lines and by the dots between block arrows a20, a21. In an embodiment, for example, a corresponding number of input interfaces 1402 can be provided (not shown) for simultaneous or parallel reception of input data.

In an embodiment, provision is made that input interface 1402 is embodied for the reception of first data or input data in the form of data packets. The data packets can have, for example, a format that is specific for communication between several functional units 1400 according to the present invention.

In a further embodiment, provision can be made that input interface 1402 can only receive written data, but explicitly does not support read accesses from outside, or alternatively cannot suppress them. Provision can also be made, in a further embodiment, that functional unit 1400 cannot convey or initiate a data transfer, in either read or write fashion, via interface 1402. For that purpose, interface 1402 can be correspondingly limited in technical fashion or that access capability can be suppressed, for example, under the control of a computer core 110*a* (FIG. 1A) and/or another component of computation unit 100.

In further embodiments (not shown) provision can also be made that a functional unit 1400 has several input interfaces 1402 of the type described above. By way of example, input interface 1402 can also be referred to as a "functional-unit-specific" input interface, since it is provided especially for, preferably direct, data communication among various functional units. "Direct data communication" between functional units is understood here as a data communication that, besides the participating functional units, at most also involves a primary connecting unit 150, for example having switching network 152, but not, for example, main connecting unit 130 of computation unit 100 according to the present invention (FIG. 1A).

Alternatively, in further embodiments (not shown) it is also possible for a functional unit to have no interface 1402 of the above-described type at all, i.e., no functional-unit-specific input interface at all. A functional unit configured in this manner accordingly cannot accept any input data from another functional unit via input interface 1402 recited above. A functional unit of this kind can, however, for example be embodied to load data from another source, for example from primary memory device 120 of the computation unit via connection a9 (FIG. 1E) and/or from secondary memory device 160 (cf. FIG. 1F). The loading of such data from another source can occur via a correspondingly configured interface of another kind, for example via a direct data connection, e.g., between the functional unit and secondary memory device 160 as symbolized in FIG. 1F by block arrow a12. One such interface of a different kind is also indicated in FIG. 2A by block arrow a24 drawn with dashed lines.

In a preferred embodiment, functional unit 1400 is embodied to read in via interface a24, or output thereto, a predefinable number of data words, for example at least one data word, or else, for example, N data words where N≥1. This can preferably be accomplished autonomously, i.e. with no need for (re)configuration of the functional unit or interaction between the functional unit and other components before all the data words to be read in or outputted have been respectively read or written. Optionally, the functional unit can also be embodied to output, to a downstream functional unit, information that characterizes the respectively read-in or outputted quantity of data words.

Advantageously, in accordance with further embodiments functional units 1400 can be embodied in such a way that the first input data received by the functional unit via input interface 1402 are outputted via interface a24, without modification or in processed form, in particular to secondary memory device 160 and/or in particular also to one of the remaining components of computation unit 100, in particular to primary memory device 120 or to further peripheral components 125.

In accordance with an embodiment, functional unit 1400 has an optional output interface 1404 for the output of output data. For example, output data are created by functional unit 1400 depending on the first data received via input interface 1402, and are outputted as second data via output interface 1404, for example to one or more other functional units (not shown in FIG. 2A). In some embodiments a data output from functional unit 1400 via its output interface 1404 to itself, e.g., via its input interface 1402, is likewise possible. The output data are symbolized in FIG. 2A by block arrow a22. Particularly advantageously, output interface 1404 is also linked to switching network 152*a* (FIG. 1A); see also input interface 1504, symbolized in FIG. 2A by a dashed rectangle, of switching network 152*a*.

In further embodiments (not shown), provision can also be made that a functional unit has several output interfaces 1404 of the type described above. By way of example, output interface 1404 can also be referred to as a "functional-unit-specific" output interface, since it is provided especially for, preferably direct, data communication among various functional units.

In a further advantageous embodiment, provision can be made that functional unit 1400 can output several output data, in particular simultaneously, this being indicated in FIG. 2A by block arrow a23 drawn with dashed lines and by the dots between block arrows a22, a23. As described previously, a corresponding number of output interfaces 1404 can be provided for simultaneous or parallel output.

In a further embodiment, provision can be made that input interface 1404 can only write data, but does not support read accesses from outside nor can alternatively suppress them. Provision can also be made, in a further embodiment, that functional unit 1400 cannot receive externally initiated data transfers, in either read or write fashion, via interface 1404. For that purpose, interface 1404 can be correspondingly limited in technical fashion, or that access capability can be suppressed.

Alternatively, in further embodiments (not shown) it is also possible for a functional unit to have no interface 1404 of the above-described type at all, i.e. no functional-unit-specific output interface at all. A functional unit configured in this manner accordingly cannot output any output data via the aforementioned output interface 1404 to other functional units. A functional unit of this kind can, however, for example be embodied to output data from another source, for example by writing into primary memory device 120 of the computation unit e.g. via connection a9 (FIG. 1E) and/or into secondary memory device 160, e.g. via connection a12 (cf. FIG. 1F). The writing of such data can occur via a correspondingly configured interface of another kind, for example via a direct data connection between the functional unit and secondary memory device 160 as symbolized in FIG. 1F by block arrow a12. One such interface of another kind is also indicated in FIG. 2A by block arrow a24, already mentioned above, drawn with dashed lines.

For example, it is also possible to provide a functional unit 1400 that is provided, for example, for detecting errors in the processing and/or storage and/or transfer of data, without output interface 1404. A functional unit of this kind can, for example via an output signal, for example convey an interrupt request, for instance in order to signal a detected error to other components of computation unit 100 such as a computation core 110*a* and/or further peripheral components 125. Interrupt request IRQ can be generated and outputted, for example, by a local control device 1410 of functional unit 1400 which is also usable, for example, for error detection.

In a further embodiment a functional unit 1400 that is provided for the detection of errors in the processing and/or storage and/or transfer of data can also be provided with at least one output interface 1404. For example, the (if applicable, corrected) data, status information, in particular error information, configuration data, and/or further data, can be outputted to at least one downstream functional unit. Advantageously, the at least one downstream functional unit can then, via an output signal, for example convey an interrupt request IRQ, for instance in order to signal to other components of computation unit 100, for example a computation core 110*a* and/or further peripheral components 125, an error detected by the foregoing functional unit.

Advantageously, in further embodiments functional units 1400 can be embodied in such a way that the data received by the functional unit via interface a24 are outputted via output interface 1404, without modification or in processed form, to one or more downstream functional units 1400, data from secondary memory device 160 and/or in particular also from the remaining components of computation unit 100, in particular primary memory device 120, or from further peripheral components 125, in particular being read in by way of interface a24.

Functional unit 1400 furthermore has a local control device 1410 that is embodied to control operation of functional unit 1400. For example, local control device 1410 can encompass at least one state machine 1410*a*. In alternative embodiments local control device 1410 can also encompass other, preferably hard-wired, hardware circuits.

In a particularly preferred further embodiment, local control device 1410 can also have allocated to it a local reconfiguration device 1412 that enables configuration or reconfiguration of functional unit 1400, in particular also dynamically, i.e., while functional unit 1400 is operating. In a further embodiment it is also possible to model the functionality of local reconfiguration device 1412 by way of a corresponding part of state machine 1410*a* or of local control device 1410.

In a further embodiment, reconfiguration device 1412 is embodied to take into consideration the possible configuration variants of the relevant functional unit 1400 during a configuration or reconfiguration and/or to ensure that a configuration proceeds from a defined, valid starting point or initial state, and/or is embodied such that a reconfiguration does not negatively affect or inadvertently interrupt currently proceeding calculations or other functions of functional unit 1400.

In a further advantageous embodiment, the functional unit has a local calculation unit 1420. In accordance with a further advantageous embodiment, local calculation unit 1420 can have at least one coarse-grain hardware element or can be embodied as a coarse-grain hardware element. In this case local reconfiguration device 1412 can advantageously, for example, control a (re)configuration of the coarse-grain hardware elements. In some embodiments local calculation unit 1420 is also advantageously usable for the detection of errors in the processing and/or storage and/or transfer of data by at least one component of the computation unit. Local calculation unit 1420 can have for this purpose, for example, a comparator (not shown) that compares output data calculated, for example, redundantly (by other functional units and/or by its own) for purposes of error detection.

In a further preferred embodiment, at least one of the functional units of a computation unit 100 has at least one coarse-grain hardware element. Alternatively or in supplementary fashion, at least one of the functional units can be embodied as a coarse-grain hardware element. "Granularity"

is understood in general as the degree to which a system is assembled from individual units distinguishable from one another. A "coarse-grain" system is assembled from comparatively few, comparatively large coarse-grain elements, whereas a "fine-grain" system is assembled from comparatively many, comparatively small fine-grain elements. In specific, granularity in the sector of computer architectures can be described by way of the number of logic gates and, associated therewith, in particular by a ratio between computing operations or processing times and communication or data exchange. In fine-grain hardware elements (one logic gate each), simple logical operations can be performed quickly in a comparatively short execution time, but data are exchanged frequently between individual elements. In contrast thereto, in coarse-grain hardware elements (several logic gates each), complex operations having comparatively long execution times can in particular be respectively performed, and data are exchanged more seldom between individual elements.

"Coarse-grain" hardware elements are thus to be understood in particular as elements that can each autonomously perform complex computation operations, in particular without frequently exchanging data with one another for that purpose. For example, the individual coarse-grain hardware elements are respectively embodied as one of the following elements: higher-complexity elements such as an arithmetic logic unit (ALU), memory access unit, communication interface, and/or less-complex units such as a comparator, adder, multiplier, divider, shift register, barrel shifter, multiplier-accumulator (MAC), register or register block, memory unit (e.g. RAM, flash, etc.), multiplexer (e.g. 2:1 MUS, M:N MUX), demultiplexer, comparator (e.g. for redundantly calculated output data A1, A2), checksum calculation units, error correction units (which can utilize, for example, error-correcting codes).

For example, conventional configurable-hardware logic circuits such as FPGAs or CPLDs usually encompass only fine-grain hardware elements whose configuration can be modified only by way of external specifications. Conventional configurable-hardware logic circuits of this kind are thus to be regarded as (integrated) circuits that can be programmed at a hardware level in a special programming phase. This also applies to FPGAs having the capability for partial reconfiguration. Here a corresponding number of function-determining reconfiguration capabilities that can be modified in accordance with external specifications are kept on hand, and the relevant FPGA sections are correspondingly reprogrammed and interconnected by way of a partial reconfiguration in a respective special reprogramming phase. The reconfigured FPGA portions modify the logic function itself.

In contrast thereto, functional unit 1400 according to the present invention represents a calculation unit, or a component of a calculation unit, whose elements, e.g. coarse-grain hardware elements, can be configured in terms of function and, for instance, reconnected to one another, internally by way of functional unit 1400 itself or its local control device 1410. Provision can also be made that a further component of computation unit 100 (FIG. 1A), for example a computation core 110a, configures functional unit 1400 or its components.

In a particularly preferred embodiment a functional unit provided for error detection is in particular embodied entirely as a hardware circuit. This encompasses, for example, both the capability of comparing redundantly calculated received data, and the capability of detecting and/or correcting errors in data transfer. Preferably the comparison of redundantly calculated received data is accomplished in local calculation unit 1420 (FIG. 2A), and error handling that results, if applicable, therefrom is accomplished in control device 1410.

Detection and/or correction of errors in data transfer is preferably accomplished in input interface 1402, for example utilizing the received parity information and/or error-correcting codes. Upon data transfer, those data can preferably be supplemented, by output interface 1404, with parity information and/or error-correcting codes so as to enable error detection and/or error correction by downstream functional units or other components.

A further aspect of the configurability according to the present invention involves influencing communication and data flow between various functional units 140, 140a, 140b (FIG. 1A), which can be controlled e.g. by corresponding configuration of the respective functional units, and/or by controlling operation of the primary connecting unit(s) 150 (cf. FIG. 1A) connecting the respective functional units.

As already described repeatedly above, for this purpose at least one component 110a, 125, 140 of computation unit 100 can be embodied to modify a configuration of at least one functional unit and/or of primary connecting unit 150, computation unit 100 being embodied to at least temporarily suppress a modification of the configuration of the at least one functional unit and/or of primary connecting unit 150.

In an embodiment, the internal function, e.g., logic function, of individual coarse-grain hardware elements or other elements of functional unit 1400 is respectively hard-wired and thus, in contrast to conventional configurable-hardware logic circuits, does not change. As described above, influence can be exerted on the communication and data flow between various functional units in order to achieve reconfiguration.

Advantageously, in some embodiments, a reconfiguration of the computation unit according to the present invention or of at least one of its functional units 1400 can be controlled, carried out, and if applicable monitored by computation unit 100, or by control device 1410 integrated into the relevant functional unit 1400, itself, i.e., internally. Functional unit 1400 can thus independently and automatically reconfigure itself.

Particularly preferably, a (re)configuration can be accomplished while computation unit 100 or functional unit 1400 is operating, for instance as part of an overall algorithm that is to be evaluated by one or more of functional units 1400, 140, 140a, . . . . Provision can advantageously be made that functional units 1400, for example 140a and 140b, configure other functional units 1400, for example 140c and 140d, or components thereof, for instance in order to implement a comprehensive overall algorithm of this kind.

In a preferred embodiment, provision is made that functional unit 1400 reconfigures itself in particular when a predefinable computation segment or a predefinable calculation task has been executed or completed and the corresponding resources of the functional unit are therefore no longer needed for that calculation task. In such a case functional unit 1400 can advantageously modify its own configuration, for instance, in such a way that it is suitably configured for a subsequent computation segment or a subsequent calculation task.

In a further advantageous embodiment, local calculation unit 1420 can have at least one of the following components: adder, multiplier, divider, shift register, barrel shifter, comparator, multiplier-accumulator (MAC), arithmetic logic unit (ALU), memory unit, register, multiplexer, demultiplexer, interface, in particular communication interface, memory access unit (e.g. DMA unit), unit for calculating exponential functions, unit for calculating logarithmic functions, unit for calculating exponential functions, unit for calculating root functions, unit for calculating trigonometric functions, lookup table(s), comparator (for instance, for redundantly calculated output data A1, A2), checksum calculation units, units generating error-correcting codes, error detection units, error correction units (which can, for example, use error-correcting codes). Combinations thereof are likewise possible in further embodiments. One or more of the components described above can preferably be disposed in calculation unit 1420 of functional unit 1400 according to the present invention.

Calculation unit 1420 can accordingly perform calculations, for instance a comparison, on the input data delivered to functional unit 1400, and can output, for example as output data, results obtained therefrom. A data flow for this procedure preferably occurs via input interface 1402 (reception of input data), calculation unit 1420 (execution of calculations), output interface 1404 (output of output data). This data flow is characteristic of the calculation or processing of data within a functional unit 1400. In further embodiments, if a functional unit 1400 also possesses, for example, the ability to detect errors in the processing and/or storage and/or transfer of data, additional output signals, in particular an error signal and/or an interrupt signal, can be outputted.

In accordance with a preferred embodiment, the data flow can be influenced outside functional unit 1400 by specifying the (further) functional unit to which output data of a first functional unit are to be forwarded; this can be implementable by corresponding control of primary connecting unit 150. Control data therefor can be stored, for example, in configuration memory 151 (FIG. 1A) of primary connecting unit 150 or can be modified by components of computation unit 100, e.g. computation core 110*a* (FIG. 1A).

Advantageously, control of primary connecting unit 150 can be adjusted once, and thus permanently for a specific period of time. It can likewise be advantageous to make control of primary connecting unit 150 dependent on control data that are transmitted along with individual packets, or also with each packet, in particular by indicating a destination functional unit 1400.

If more-complex calculations are to be performed, then in further embodiments several functional units, for example of the type illustrated in FIG. 2A, which have calculation units 1420 configured similarly or dissimilarly, can be provided. A data flow of data between the various functional units can advantageously be defined in this context by an algorithm or by the structure of the more-complex calculations to be performed. Particularly advantageously, a computation unit has several functional units for performing calculation tasks, and optionally at least one functional unit for detecting errors in the processing and/or storage and/or transfer of data.

In a further advantageous embodiment, provision is made that functional unit 1400 has a local configuration memory 1430. Particularly preferably, local configuration memory 1430 can encompass a register memory, local configuration memory 1430 in particular encompassing at least one, but advantageously a plurality of, configuration registers 1432*a*, 1432*b*, 1432*c*, 1432*d*. In a further embodiment the local configuration memory can also be represented by a SRAM or by a combination of a register memory and SRAM. The embodiment encompassing a SRAM will be construed below as a register memory. Local configuration memory 1430 makes possible efficient configuration and reconfiguration even while functional unit 1400 is operating, for example by the fact that one or more configuration registers 1432*a*, 1432*b*, 1432*c*, 1432*d* are modified in the desired manner. The modification of configuration registers 1432*a*, 1432*b*, 1432*c*, 1432*d* can be accomplished, for example, by functional unit 1400 itself and/or by another functional unit (not shown). In further embodiments it is furthermore possible for modification of the configuration registers of a functional unit 1400 by further components of computation unit 100 (FIG. 1A), for example by a computation core 110*a*, to be possible, by the fact that the relevant component 110*a* writes corresponding data into the configuration register or registers of functional unit 1400. In accordance with some embodiments, for example, the manner in which errors are detected or data are compared, or the calculation and evaluation of checksums or of error-detecting or error-correcting codes, can also be influenced by the content of the configuration registers.

In preferred embodiments, computation unit 100 can also at least temporarily suppress modification of the configuration registers of a functional unit 1400 by further components of computation unit 100.

In a further advantageous embodiment, provision is made that functional unit 1400 has a local function memory 1440. Particularly preferably, local function memory 1440 can encompass a register memory or can represent a portion of a register memory. In particular, local function memory 1440 can encompass at least one function register 1442*a*. Local function memory 1440 can advantageously be used for at least temporary storage of input data and/or output data of functional unit 1440, or intermediate results of calculations of functional unit 1400 which are performed by calculation unit 1420. In a further advantageous embodiment it is also possible to equip functional unit 1400 with a plurality of register memories, a first quantity of the register memories being usable as configuration registers 1432*a*, 1432*b*, 1432*c*, 1432*d* and a second quantity of the register memories being usable as function registers 1442*a*.

In further embodiments, it is furthermore possible for a modification of the function registers of a functional unit 1400 by further components of computation unit 100 (FIG. 1A), for example by a computation core 110*a*, to be possible, by the fact that the relevant component 110*a* writes corresponding data into the function register or registers of functional unit 1400. In preferred embodiments computation unit 100 can also at least temporarily suppress the modification of the function registers of a functional unit 1400 by further components of computation unit 100. In a preferred embodiment a specific data structure, for example in the form of a data packet, is provided for data exchange between various functional units 1400. FIG. 2B is a schematic simplified depiction of a data structure DS for such data packets, in accordance with an embodiment. Data structure DS has an address field ADR. Address field ADR is subdivided into a first address ADR1 that specifies a particular functional unit for which the data packet having data structure DS is intended. An optional second address ADR2 defines a destination address within the functional unit specified by the first address, with the advantageous result that influence can be exerted as to that local memory region of the destination functional unit in which data contained in the data packet are stored. For example, second address ADR2 can be used to address specific memory registers of the destination functional unit.

In embodiments of the computation unit according to the present invention which have, for example, several tens of functional units 1400, a few bits, for example e.g. bits 10 to 5 (i.e., for example, six bits), will usually be sufficient to define first address ADR1. The situation is comparable for the "internal addressing" by way of second address ADR2 with respect to the memory registers available in functional units 1400, which, in an embodiment, are selected e.g. by way of bits 4 to 0.

Also optionally, data structure DS can have a data field DAT that encompasses input data, for example for calculation by the destination functional unit, and/or configuration data that are provided, for example, for controlling a configuration of the destination functional unit.

In further embodiments, it is likewise possible for data packets that contain an empty data field DAT, i.e., that contain neither input data for a calculation nor configuration data for the destination functional unit, to be exchanged between functional units. This may be important, for example, for synchronizing different functional units.

Optionally, data structure DS can also contain control data, which can be disposed in the data field labeled with the reference character CTRL. These can be, for example, additional control data (i.e., in addition to the configuration data that are contained, if applicable, in data field DAT), for example status information, safety information, information relating to a loop depth or recursion depth in the context of nested execution of loops or recursive calculations. Alternatively or in supplementary fashion, control data CTRL can also contain parity information and/or checksums and the like. Combinations of the information types recited above for the control data are likewise possible.

In a further preferred embodiment at least one of the functional units as already indicated above is embodied as a hardware circuit, in particular entirely as a hardware circuit. It is thereby advantageously possible for calculations, logic operations, memory operations, and other functions furnished by the relevant functional unit, for example implementation of lookup tables, characteristic curves, and/or characteristics diagrams, comparisons (in particular of redundantly calculated output data), creation and/or evaluation of parity information and/or error-detecting or error-correcting codes, to be performed particularly quickly and efficiently.

In a further advantageous embodiment, provision is made that at least one of functional units 140, 140a, . . . , 140p has at least one of the following elements: a microcontroller, a software-executing computation core (e.g., a computation core that is embodied to execute software), a digital signal processor (DSP), a programmable logic circuit (for example, a field programmable gate array (FPGA)), an application-specific integrated circuit (ASIC), in particular an integrated circuit that is prefabricated by way of a gate array and/or transistor array but is not yet interconnected in application-specific fashion, which for instance is interconnected in application-specific fashion only in a later production step, and which can be referred to, for example, as a "sea of gates." In a particularly preferred embodiment, provision is made that all the functional units are embodied as a hardware circuit, in particular entirely as a hardware circuit. This results in a particularly efficient, capable, and physically small assemblage. In other embodiments it is possible for one or more functional units to be embodied as a hardware circuit, in particular entirely as a hardware circuit, and for at least one component not embodied entirely as a hardware circuit, or another component, to be provided in the form of at least one further functional unit. In a particularly preferred embodiment, for example, a first quantity of functional units can be provided which are embodied entirely as a hardware circuit, and a further functional unit can have, for example, a microcontroller or a programmable logic module or a programmable logic circuit or a comparatively easily modifiable logic circuit.

In particularly preferred embodiments, a comparatively complex calculation device is furnished by way of several components connected to one another, for example an adder, multiplier, divider, shift register, barrel shifter, comparator, multiplier-accumulator, arithmetic logic unit, exponential unit, logarithm unit, trigonometric unit, memory unit, memory access unit, register, multiplexer, interface, in particular communication interface, or in general coarse-grain hardware elements that can constitute the functional unit(s) or constituents thereof; according to the present invention advantageously at least one first functional unit is embodied to receive first data from at least one further functional unit and/or to transmit second data to at least one further functional unit, as has already been described above. It is thereby possible to define a data flow that, inter alia, also enables the execution, for example in a predefinable sequence in accordance with an algorithm that is to be evaluated or another computation rule, of comparatively complex calculations that, for example, utilize a plurality of the components or coarse-grain hardware elements recited above, or in general calculation units, which can be distributed over several functional units. The predefinable sequence can be controlled, for example, by the data flow between the various functional units. As already described above, this can be accomplished, for example, by defining corresponding destination addresses ADR1 within individual data packets (cf. FIG. 2B).

In accordance with a further aspect of the present invention, this data flow can particularly advantageously also be influenced or modified, i.e., reconfigured, dynamically, i.e. during a runtime of the computation unit according to the present invention. In a preferred embodiment this can be brought about, for example, by corresponding control of primary connecting unit 150, e.g., by modifying data in a corresponding configuration memory 151 (FIG. 1A). In an embodiment, primary connecting unit 150 advantageously is controlled by computation cores 110a, 110b, 110c and/or by a further peripheral component 120 (in particular by a DMA control device). In a further embodiment, primary connecting unit 150 is, alternatively or in supplementary fashion, advantageously controlled by way of a functional unit 140. In further embodiments, comparable control is also possible for secondary connecting unit 155a (FIG. 1C).

Aspects of a data flow or information flow within functional unit 1400 as shown in FIG. 2A will be described below by way of example. As already mentioned above, functional unit 1400 can, for example, receive one or more data packets, having the structure DS characterized in further detail in FIG. 2B, via its input interface 1402. Input data contained therein, which in the present case can be configuration data, are forwarded from input interface 1402, preferably under the control of an address detection unit 1452 and depending on address information a26 of the data packet, to a specific configuration register 1432b, as indicated in FIG. 2A by arrow a25.

In a preferred embodiment, address detection unit 1452 can have, for example, a demultiplexer structure that is controlled directly by address information ADR2 contained in a data packet. Functional unit 1400 can furthermore possess a test unit 1453 with which it is possible to check whether valid input data are present in functional unit 1400. This information can be transferred from test unit 1453, for example, to local control device 1410 of functional unit 1400 (cf. arrow a30 of FIG. 2A) which, depending on that information, controls the operation of functional unit 1400 and, for example, of calculation unit 1420.

A data connection between local control device 1410 and configuration memory 1430 or function memory 1440 is indicated in the present case by arrow a31. A data connection between calculation unit 1420 and configuration memory 1430 or function memory 1440 is indicated in the present case by arrow a32. In some embodiments a direct data connection can also exist particularly advantageously between control device 1410 and calculation unit 1420 (cf. arrow a33).

In a further preferred embodiment, a multiplexer structure 1454 is provided which is embodied to identify the register memory or memories and/or configuration memories, or other sources of functional unit 1400, from which possible output data for outputting via output interface 1404 are obtained. By way of example, multiplexer structure 1454 can be controlled by way of the contents of a configuration register 1432d (cf. arrow a29).

For assembly of a data packet to be outputted, the data to be outputted can be furnished, for example, by way of multiplexer structure 1454 (cf. arrow a27). Address information for the data packet to be outputted can be furnished or read out, for example, from a configuration register 1432c (cf. arrow a28). The address information for the data packet to be outputted can, for example, in turn contain address ADR1 (FIG. 2B) for a destination functional unit to which the data packet for output is to be outputted, as well as, if applicable, further address information ADR2 for internal addressing within the destination functional unit.

An advantage of the present invention is the fact that functional units 140, 140a, . . . , 140p, 1400 can actively, directly, and autonomously communicate with one another and exchange data (with no need for control by, for instance, the computation cores of the computation unit); and that configuration, or modification of the configuration, of functional units and/or connecting units 150, 155a by other components is possible and, if applicable, can at least temporarily also be suppressed. Advantageously, the functional units can output data packets, in particular functional-unit-specific data packets, to other functional units, and can receive data packets, in particular functional-unit-specific data packets, from other functional units.

In accordance with a further embodiment, particularly preferably the functional units can themselves define the further functional unit or data sink to which output data of the functional unit are to be outputted, for example in the form of one or more data packets. Definition by way of corresponding control, for instance, of primary connecting unit 150 or its connection configuration data VBK is likewise possible.

It is particularly advantageous that, aside from the functional units and a primary connecting unit 150 connecting them, no further component of computation unit 100 is necessary in order to enable corresponding data exchange between the functional units. In particular, a higher-order unit than the functional units, for example a computation core 110a, is not necessary in order to enable data exchange. Particularly advantageously, a higher-order unit than functional unit 1400 is also not necessary in order to ascertain, during the runtime of the functional units, a respective destination for output data of a functional unit, since in preferred embodiments that task can be taken on by local control device 1410 (FIG. 2A), or the specification of a destination address can be derived from input data and configuration data obtained via input interface 1402.

In further advantageous embodiments, the calculation data or output data of the functional unit can depend on the configuration of the functional unit, on the input data delivered, and if applicable on additional input data or input signals that are deliverable to the functional unit, for example, via further input interfaces (not shown). For example, if a direct data connection is provided between the functional unit and an external component 200 (for instance, a timer module of the computation unit or an input/output interface of the computation unit), for example values of a register overlaid by external component 200 into the functional unit can likewise have an influence on the output data of the functional unit.

In a further particularly preferred embodiment a plurality of functional units of a similar or of different kinds can be combined with one another and connected to one another in terms of data via a primary connecting unit, thereby producing a form of calculation network or calculation device that can be embodied to calculate a specific algorithm. Particularly preferably, the calculation device can calculate algorithms that exhibit greater complexity than the algorithms that can be calculated by individual functional units that are constituents of the calculation device. "Flexible hardware supplement" 1500 of FIG. 1A in particular represents such a calculation device, as does each one of groups G1, G2 of FIGS. 1C, 1D.

In a further preferred embodiment, all components of the computation unit according to the present invention are disposed on one and the same semiconductor substrate and/or are manufactured using the same semiconductor production technology. Particularly advantageously, functional units 140, 140a, 140b, . . . , 14op; 1400 according to the present invention are also disposed on the same semiconductor substrate as further components 110a, 110b, 110c, 115, 120, 130, 150, 155, 160 of the computation unit. The advantageous results thereof are a configuration that is particularly physically small, and the possibility of establishing an efficient and high-performance data connection between the components, for example incorporating main connecting unit 130 and at least one primary connecting unit 150.

Figure 3:
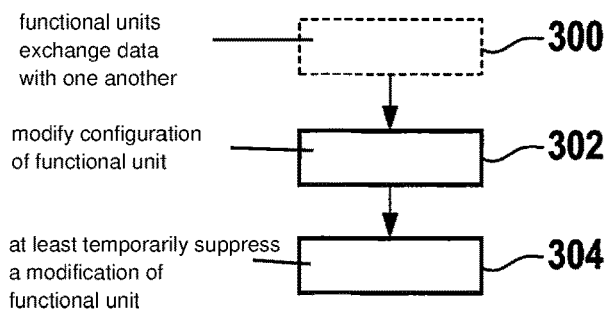
FIG. 3 is a schematic, simplified flow chart of an embodiment of the method according to the present invention.

FIG. 3 is a schematic, simplified flow chart of an embodiment of a method for operating a computation unit 100, 100a, 100b, 100c, 100d, 100e according to the present invention (cf. FIGS. 1A to 1F).

In an optional first step 300, functional units 140, 140a, (FIG. 1A) exchange data with one another, for example by transmission and/or reception in accordance with the structure according to FIG. 2A described above by way of example. Those data can be, for example, input data or intermediate results or output data of calculations. According to preferred embodiments, the reception and transmission of data in accordance with step 300 can be accomplished respectively via corresponding input interfaces 1402 (FIG. 2A) and output interfaces 1404.

In a subsequent step 302, at least one component of computation unit 100 (FIG. 1A), for instance a second computation core 110b, modifies a configuration of functional unit 140a, for example in order to exert influence on the calculations that can be performed by way of functional unit 140a.

In step 304, the computation unit then at least temporarily suppresses a modification of the configuration of functional unit 140a (and/or of other functional units). This can be accomplished, for example, by way of first computation core 110a. The result achieved thereby is that, for example, second computation core 110b can, at least temporarily, produce no (further) change in the configuration of functional unit 140a.

Figure 4:
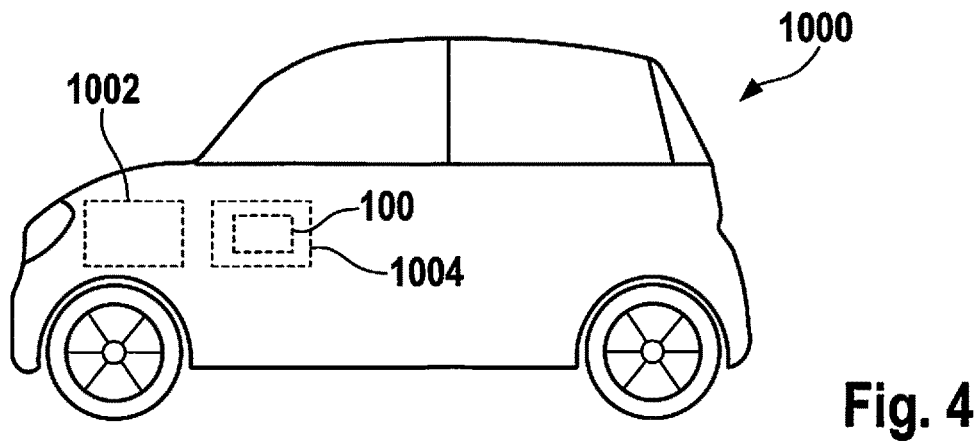
FIG. 4 shows an operating scenario in accordance with an embodiment.

FIG. 4 schematically shows an operating scenario of a computation unit 100 in accordance with the present invention. Computation unit 100 is a constituent of a control device 1004 for an internal combustion engine 1002 of a motor vehicle 1000. Computation unit 100 has, for example, a configuration as described above with reference to FIGS. 1A to 1F.

Computation unit 100 according to the present invention exhibits particularly wide flexibility because the functional units contained in it can flexibly exchange data with one another and, if applicable, can in fact be dynamically configured or reconfigured, redundant calculations and the application of error-detecting or error-correcting codes, for example, also being efficiently made possible, preferably as necessary. At the same time, the further capability according to the present invention of at least temporarily suppressing a modification of the configuration of at least one functional unit leads to particularly reliable operation of computation unit 100.

Figure 5:
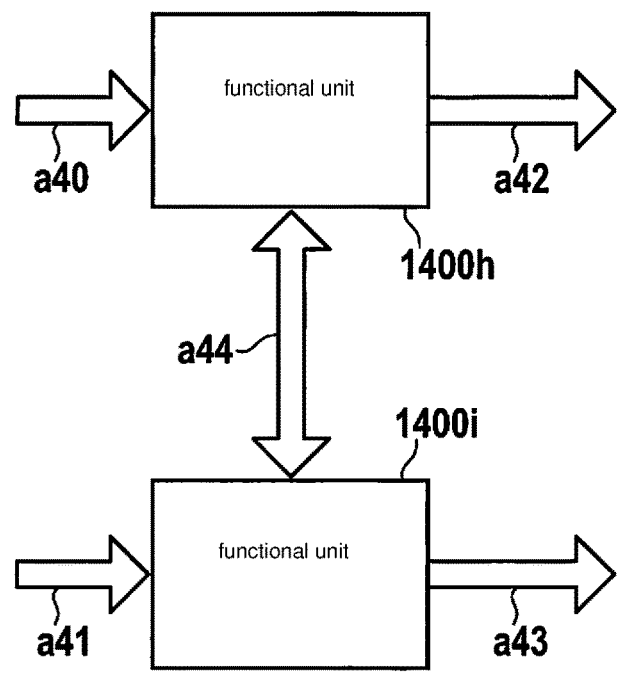
FIG. 5 schematically shows a further embodiment.

In a further advantageous embodiment, provision is made that at least two functional units are coupled to one another in order to enable an increase in the data width of data that are to be processed. FIG. 5 schematically shows, for this purpose, a simplified block diagram in which two functional units 1400h, 1400i of a computation unit according to an embodiment are shown.

In the embodiment described here, functional units 1400h, 1400i can operate in a first mode independently of one another. For example, functional unit 1400h processes input data a40 that are delivered to it and have a first data width of, for example, 32 bits, with the result that output data a42 likewise having, for example, a data width of 32 bits are obtained. Functional unit 1400i processes input data a41 (likewise having a data width of, for example, 32 bits) that are delivered to it, independently of the operation of functional unit 1400h and independently of the processing of input data a40, with the result that output data a43 likewise having, for example, a data width of 32 bits are obtained.

In a second operating mode, however, functional units 1400h, 1400i can also be coupled to one another, which is indicated by block arrow a44. This allows an increase in the data width of the data now being processed by functional units 1400h, 1400i together, for example now to 64 bits. Particularly preferably, the participating functional units can be embodied to distribute operands, and the computation steps to be performed on them, among one another and/or to divide them between functional units 1400h, 1400i or their respective local calculation units (not shown) (cf. arrow a44). Arrow a44 here characterizes a separate data connection between functional units 1400h, 1400i which allows functional units 1400h, 1400i to be coordinated in terms of their shared data processing.

In an embodiment, functional units 1400h, 1400i can be embodied to switch between the first operating mode and the second operating mode dynamically (while functional units 1400h, 1400i are operating). This can be achieved, for example, by corresponding configuration of functional units 1400h, 1400i.

In a further advantageous embodiment, provision is made that the functional units synchronize themselves with regard to reception of their respective input data a40, a41 so that shared data processing can be executed correctly. This can encompass, for example, the fact that all the participating functional units wait to execute calculations until all the participating functional units possess valid input data, in particular if an unsynchronized calculation start would result in an erroneous calculation. Advantageously, the functional units also synchronize with one another during execution of the calculations. If the output data resulting from shared data processing exceed the data width of one functional unit, for example 32 bits, provision can be made in some embodiments that functional units 1400h, 1400i transmit the output data, for example, in divided form to one or more destination functional units.

In an embodiment, the partial output data can be transmitted by only some of the participating functional units, for example by exactly one.

In an alternative embodiment, all the participating functional units can transmit a corresponding portion of the separated partial output data.

In both of the embodiments described above, transmission of the partial output data can be accomplished, for example, in chronological sequence, in the latter embodiment also in parallel fashion.

According to an embodiment, for example, both functional units 1400h, 1400i are embodied to perform additions ("ADD") and subtractions ("SUB") with a data width of 32 bits. In the coupled operating procedure corresponding to the second mode, functional units 1400h, 1400i can thus perform an addition or subtraction with a data width of 64 bits. For example, functional unit 1400h calculates the 32 higher-value bits, while functional unit 14009 calculates the 32 lower-value bits. Provision can furthermore be made that a "carry bit" is carried over from functional unit 1400i to functional unit 1400a cf. block arrow a44).

In some embodiments data connection a44 between the two functional units can be at least temporarily suppressed by the computation unit, thereby preventing a spillover of errors from 1400h to 1400i or vice versa.

Further aspects and advantages of the present invention are:

Possibility of complete or at least partial or limiting separation of several components 150 (FIG. 1A), 155a (FIG. 1C), 160 (FIG. 1F), 1500 (FIG. 1A) that are present, by grouping and/or separating integral components 150 (FIG. 1A), 155a (FIG. 1C), 160 (FIG. 1F), 1500 (FIG. 1A) into parts, in particular so that, in the event of an error, spillover of errors is suppressed by way of the regions that are now (at least partly) separated, or so that the number of errors possibly spilling over is limited.

Eliminating/reducing the probability that errors made by computation unit 100 and/or by components 140, 150, 160 affect the rest of the system.

In some embodiments the following is, in particular, also made possible: at least temporary prohibition/suppression/prevention/limitation of "actually" existing degrees of freedom (e.g., configuration) of component 1500 (FIG. 1A)/architecture possibilities.

In some embodiments, for example, a preferably global "enable" switch, which temporarily suppresses modification of the configuration, can be provided for all and/or some of the functional units and/or for primary connecting unit 150. The enable switch is controllable, for example, by a selected component of computation unit 100, for instance (only) first computation core 110a and/or, for instance, only a specific peripheral component 125.

In further embodiments a check can also be made as to whether the data packets sent out by transmitting functional units are to be directed to specific destination functional units and/or groups of destination functional units, and transmission to other destination functional units and/or groups of destination functional units is detected as impermissible and is correspondingly suppressed.

In some embodiments, the principle according to the present invention (modifying the configuration and/or temporarily suppressing such modifications) can also be applied selectively to one or more components 140, 140a, . . . , 150, 160. For example, the principle according to the present invention (modifying the configuration and/or temporarily suppressing such modifications) can also be applied simultaneously to several components, in particular functional units and/or groups of functional units.

In some embodiments, provision can be made that a reconfiguration of a specific functional unit 140 (for example by modification of the configuration by another component of the computation unit, for example a computation core) is made possible (i.e., in accordance with the principle according to the present invention, is not suppressed) only when the specific functional unit 140 is in a predefinable operating state (for example, a passive state) that can be signaled, for example, by a 1-bit flag ("start flag"). This prevents, for example, undesired reconfiguration (modification of the configuration) during active operation of the functional unit.

In some embodiments, provision can be made that modifications of memory elements, in particular registers (either all registers or some predefinable registers, for example configuration registers; cf. description of FIG. 2A) of one or more functional units are suppressed. It is thereby possible to prevent components of the computation unit from undesirably modifying the corresponding registers. The operating reliability of the computation unit according to the present invention is thereby further enhanced. It can preferably be applied, for example, to those registers, or parts of registers, of functional units which can operate without influence from other functional units.

In a further embodiment, provision can be made that predefinable memory accesses, for example from flexible hardware supplement 1500 (FIG. 1A), to other components of the computation unit (for instance, in particular via a24 via 155 to 130) are at least temporarily suppressed or prohibited by computation unit 100 or by one of its components, for example primary computation core 110a. The relevant memory regions can thereby be protected, thus preventing, for example, undesired modification of those memory regions by an incorrectly operating functional unit. It is thereby also possible in particular to protect a primary memory device 120 that is present if applicable, a secondary memory device 160, and further peripheral components 125 from undesired (write and/or read) accesses.

All in all, application of the principle according to the present invention results in a great deal of flexibility in terms of limiting possible (re)configuration of functional units 140, in particular all or only selected functional units. In some embodiments, in particular, it is possible to stipulate exactly those components of the computation unit, in particular those functional units, for which configuration, or a modification of the configuration, can be at least temporarily suppressed. The principle according to the present invention can thus be applied selectively to individual, or to several, functional units. In some embodiments comparable flexibility is also provided by the fact that it is possible to define which component or components of the computation unit are permitted to effect a modification of the configuration of at least one functional unit and/or of the primary connecting unit, and/or which component or components of the computation unit are permitted to at least temporarily suppress a modification of the configuration of at least one functional unit and/or of the primary connecting unit.

In a further embodiment, provision is made that when an error has been identified in the region of the computation unit, in particular of a functional unit, one or more data packets, or in general data exchange with the relevant erroneous component, in particular functional unit, is blocked, for example such that relevant data packets are discarded or held back until reception of those data packets is once again possible. Alternatively or in supplementary fashion, an error reaction can be initiated, for example in the sense of a signal by way of an interrupt request via a distributor device for interrupt requests (interrupt router). Alternatively or in supplementary fashion, provision can also be made that the computation unit performs one or more actions to resolve errors, for example resetting one or more functional units or the relevant incorrectly operating component. Alternatively or in supplementary fashion, a complete shutdown of at least one component, or of the entire computation unit, can be provided.

Some embodiments make possible, at least temporarily, a suppression or locking of a reconfiguration of at least one component of the computation unit; in further embodiments this can be applied particularly preferably during active calculation of an algorithm by one or more functional units. It is likewise possible to at least temporarily suppress a reconfiguration of a first functional unit by a second functional unit. It is likewise possible to at least temporarily suppress a reconfiguration of a functional unit by another component of the computation unit or even by a component disposed externally to the computation unit (which can access at least one functional unit, for example via direct memory access).

In further embodiments at least one of the following actions can also be provided: inhibiting write privileges and/or read privileges and/or inhibiting (re)configuration of specific units 140, 150, 160 to specific units. In further embodiments the inhibition can, for example, be time-limited, and/or can be limited depending on events.

Particularly advantageously, application of the principle according to the present invention also allows possible negative effects of transient errors caused in the computation unit, in particular one-time radiation errors (due to penetration of ionizing radiation), or permanent errors, in particular permanent physical errors, to be reduced or prevented.

Further advantageous areas of application for the principle according to the present invention and the computation unit according to the present invention are control devices for the operation of electric motors or generators, control devices for batteries, driver assistance systems, chassis systems, electric power tools, household appliances, and the like.

Computation unit 100 according to the present invention advantageously makes possible efficient, secure (for instance, optionally by way of redundancy and/or error-correcting codes) execution of computation-intensive and complex mathematical calculations (in particular having a large [computation] depth; many computation operations) without requiring for that purpose special accelerator hardware such as the use of several digital signal processors (DSPs) or ASICs in addition to a conventional microcontroller or integrated into a microcontroller or the like. Instead, the computation-intensive and complex mathematical calculations, and security and error correction, can advantageously be performed by functional units 140, . . . , 1400 according to the present invention, which furthermore are flexibly connectable to one another, thereby enabling simple adaptation of computation unit 100 according to the present invention to a multiplicity of computation-intensive and complex mathematical calculations or algorithms. For example, computation unit 100 can advantageously be used to process sensor values, for instance in a control device of a motor vehicle.

In a preferred embodiment, an example of a resulting data processing chain is as follows: A sensor signal (for instance of a rotation speed sensor) creates input data for computation unit 100, (if applicable, secured) calculations within a computation core 110*a* of computation unit 100, further (if applicable, secured) calculations by functional units 140 according to the present invention, (if applicable, secured) further calculations by computation core 110*a*, (if applicable, secured) generation of a control signal as an output signal of computation unit 100 for downstream systems, for example actuators or output stages for applying control to actuators.

Because of its performance and operating reliability, the computation unit according to the present invention is particularly suitable for control devices for internal combustion engines, in particular of motor vehicles, in which a plurality of input values, for example sensor signals, are subjected to complex processing in order to create corresponding output signals for actuators such as magnetically or piezoelectrically actuated injection valves for a fuel injection system of the internal combustion engine, and in which comparatively stringent requirements in terms of operational safety are, generally, also applied. The computation unit according to the present invention can furthermore be used advantageously in control devices for driver assistance systems, for example in order to evaluate radar data in order to control driver assistance functions, in which conventional control devices typically have several digital signal processors so that the incoming data volumes of the radar sensor suite can be processed. The computation unit according to the present invention having the flexible hardware supplement can furthermore be used advantageously in control devices in which complex control-engineering models are calculated, and/or in which complex digital signal processing is accomplished.

In addition to the calculation capabilities already described above, which can be implemented by way of individual functional units 1400 (FIG. 2A) or by an assemblage of individual functional units, in particular by their respective local calculation unit(s) 1420, it is likewise possible to furnish the functionalities below by way of one or more functional units according to the present invention in combination, as long as, in a corresponding extension section, the requisite basic functionalities, in the form of functional units (including calculation units) are in fact present and moreover are present in sufficient quantity, configuration, and interconnection, and permit calculation with the necessary total computation performance: calculation of characteristics diagrams (including high-dimensional ones, for example having more than five dimensions), calculation of data-based models, calculation of physical models, calculation of neural networks, solution of linear equation systems, creation of inverse matrices (in particular higher-order matrices), solution of nonlinear equation systems, time-to-frequency conversion, for example by calculating the fast Fourier transform (FFT), frequency-to-time conversion, for example by calculating the inverse fast Fourier transform (iFFT), calculation of various filter types such as finite impulse response (FIR), infinite impulse response (IIR), etc. Here as well, detection and correction of errors according to the present invention can be performed, and the aforesaid calculations can thereby be secured.

What is claimed is:

1. A computation unit, the computation unit being a microcontroller for a control device, the computation unit comprising:
   at least one computation core;
   a primary memory device;
   at least one main connecting unit for connecting the at least one computation core to the primary memory device; and
   at least two functional units, at least a first functional unit of the at least two functional units being embodied at least one of: a) to receive first data from at least one further functional unit of the at least two functional units, and b) to transmit second data to at least one further functional unit of the at least two functional units, each of the at least two functional units being embodied entirely as a hardware circuit, and each of the least two functional units includes a respective local configuration memory which at least temporarily stores configuration data characterizing a configuration of the respective functional unit; and
   at least one primary connecting unit embodied to at least temporarily establish a direct data connection between the first functional unit and at least one further functional unit of the at least two functional units, the at least one primary connecting unit includes a respective configuration memory which at least temporarily stores connection configuration data which controls operation of the least one primary connecting unit;
   wherein at least one component of the computation unit is embodied to modify: (i) the configuration data of the respective local configuration memory of at least one of the at least two functional units to modify the configuration of the at least one of the at least two functional units, and/or (ii) the connection configuration data of the respective configuration memory of the primary connecting unit to modify a configuration of the primary connecting unit; and
   wherein the computation unit is embodied to at least temporarily suppress a modification of: (i) the configuration data of the respective local configuration memory of at least one of the at least two functional units, and/or (ii) the connection configuration data of the respective configuration memory of the primary connecting unit.

2. The computation unit as recited in claim 1, wherein the at least two functional units includes several groups, and each of the several groups having allocated to it at least one primary connecting unit that is embodied to at least temporarily establish a direct data connection between functional units of the relevant group.

3. The computation unit as recited in claim 2, further comprising:
at least one secondary connecting unit embodied to at least temporarily establish a direct data connection between the several groups.

4. The computation unit as recited in claim 1, wherein the at least one component of the computation unit is embodied to modify the connection configuration data of the respective configuration memory of the primary connecting unit to modify the configuration of the primary connecting unit, and wherein the at least one component of the computation unit is: (i) at least one of the at least one computation core, and/or (ii) at least one at the at least two functional units, and/or (iii) at least one peripheral component of the computation unit.

5. The computation unit as recited in claim 1, wherein the at least one component of the computation unit is embodied to modify the configuration data of the respective local configuration memory of the at least one of the at least two functional units to modify the configuration of the at least one of the at least two functional units, and wherein the at least one component of the computation unit is: (i) at least one of the at least one computation core, and/or (ii) at least one other one of the at least two functional units, and/or (iii) at least one peripheral component of the computation unit.

6. The computation unit as recited in claim 1, wherein at least one of the at least two functional units has a respective local function memory that is embodied for at least temporary storage of: (i) input data of the respective functional unit, and/or (ii) output data of the respective functional unit, and/or (iii) intermediate results of calculations of the respective functional unit, and wherein at least one of: (i) at least one of the at least one computation core, (ii) at least one other one of the at least two functional units, and (iii) at least one peripheral component of the computation unit, being embodied to modify at least a portion of the data of the respective local function memory.

7. The computation unit as recited in claim 3, wherein the computation unit is embodied to at least temporarily suppress at least one of the following actions: modification of the configuration memory of the primary connecting unit, modification of a the configuration memory of the secondary connecting unit; modification of the configuration data of at least one of the at least two functional units and modification of functional data of at least one of the at least two functional units.

8. The computation unit as recited in claim 1, wherein at least two of the at least two functional units are connectable to one another by way of a direct data connection, the computation unit being embodied to at least temporarily inhibit the direct data connection or to suppress at least one modification of data of at least one of the at least two functional units via the direct data connection.

9. The computation unit as recited in claim 1, wherein at least one of the at least two functional units has at least one coarse-grain hardware element or is embodied as a coarse-grain hardware element.

10. A control device for an internal combustion engine of a motor vehicle, comprising:
at least one computation unit, the computation unit including:
at least one computation core;
a primary memory device;
at least one main connecting unit for connecting the at least one computation core to the primary memory device;
and at least two functional units, at least a first functional unit of the at least two functional units being embodied at least one of: a) to receive first data from at least one further functional unit of the at least two functional units, and b) to transmit second data to at least one further functional unit of the at least two functional units, each of the at least two functional units being embodied entirely as a hardware circuit, and each of the least two functional units includes a respective local configuration memory which at least temporarily stores configuration data characterizing a configuration of the respective functional unit; and
at least one primary connecting unit embodied to at least temporarily establish a direct data connection between the first functional unit and at least one further functional unit of the at least two functional units, the at least one primary connecting unit includes a respective configuration memory which at least temporarily stores connection configuration data which controls operation of the least one primary connecting unit;
wherein at least one component of the computation unit is embodied to modify: (i) the configuration data of the respective local configuration memory of at least one of the at least two functional units to modify the configuration of the at least one of the at least two functional units, and/or (ii) the connection configuration data of the respective configuration memory of the primary connecting unit to modify the configuration of the primary connecting unit; and
wherein the computation unit is embodied to at least temporarily suppress a modification of: (i) the configuration data of the respective local configuration memory of at least one of the at least two functional units, and/or (ii) the connection configuration data of the respective configuration memory of the primary connecting unit.

11. A method for operating a computation unit, the computation unit being a microcontroller for a control device, the computation unit including at least one computation core, a primary memory device, and at least one main connecting unit for connecting the at least one computation core to the primary memory device, the computation unit having at least two functional units, at least a first functional unit of the at least two functional units being embodied at least one of: a) to receive first data from at least one further functional unit the at least two functional units, and b) to transmit second data to at least one further functional unit of the at least two functional units, each of the at least two functional units being embodied entirely as a hardware circuit, and each of the least two functional units includes a respective local configuration memory which at least temporarily stores configuration data characterizing a configuration of the respective functional unit, at least one primary connecting unit being provided which is embodied to at least temporarily establish a direct data connection between the first functional unit and at least one further functional unit of the at least two functional units, the at least one primary connecting unit includes a respective configuration memory which at least temporarily stores connection configuration data which controls operation of the least one primary connecting unit, the method comprising:
modifying, by at least one component of the computation unit: (i) the configuration data of the respective local configuration memory of at least one of the at least two functional units to modify the configuration of the at least one of the at least two functional units, and/or (ii) the connection configuration data of the respective configuration memory of the primary connecting unit to modify a configuration of the primary connecting unit, and wherein the computation unit at least temporarily suppresses a modification of: (i) the configuration data of the respective local configuration memory of the at least one of the at least two functional units, and/or (ii) the connection configuration data of the respective configuration memory of the primary connecting unit.

12. The computation unit as recited in claim 1, wherein the primary connecting unit includes at least one non-blocking switching network connected to the at least two functional units, the non-blocking switching network at least temporarily establishing the direct data connection between the first functional unit and the at least one further functional unit of the at least two functional units.

13. The computation unit as recited in claim 1, wherein each of the at least two functional units: (i) performs calculations, and/or (ii) performs logic operations, and/or (iii) implements a lookup table, and/or (iv) implements a characteristic curve, and/or (v) performs comparisons, and/or (vi) creates parity information, and/or (vii) evaluates parity information, and/or (viii) creates error-detecting codes, and/or (ix) evaluates error-detecting codes, and/or (x) creates error-correcting codes, and/or (xi) evaluates error-correcting codes.

14. The computation unit as recited in claim 1, wherein the primary connecting unit is external to the at least two functional units.

* * * * *